US011934377B2

(12) United States Patent
Parmar

(10) Patent No.: US 11,934,377 B2
(45) Date of Patent: Mar. 19, 2024

(54) CONSISTENCY CHECKING FOR DISTRIBUTED ANALYTICAL DATABASE SYSTEMS

(71) Applicant: Microsoft Technology Licensing, LLC, Redmond, WA (US)

(72) Inventor: Maninderjit Singh Parmar, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 157 days.

(21) Appl. No.: 17/185,674

(22) Filed: Feb. 25, 2021

(65) Prior Publication Data

US 2022/0269669 A1   Aug. 25, 2022

(51) Int. Cl.
*G06F 16/23* (2019.01)
*G06F 16/18* (2019.01)
*G06F 16/215* (2019.01)

(52) U.S. Cl.
CPC ...... *G06F 16/2365* (2019.01); *G06F 16/1865* (2019.01); *G06F 16/215* (2019.01)

(58) Field of Classification Search
CPC ...... G06F 16/16; G06F 16/182; G06F 16/215; G06F 16/2365
See application file for complete search history.

(56) References Cited

U.S. PATENT DOCUMENTS

| | | | |
|---|---|---|---|
| 2003/0084074 A1* | 5/2003 | Balogh | G06F 9/546 |
| 2005/0278394 A1 | 12/2005 | Oks et al. | |
| 2006/0155753 A1* | 7/2006 | Asher | G06Q 10/06 |
| | | | 707/999.102 |
| 2013/0058215 A1 | 3/2013 | Koponen et al. | |
| 2018/0046947 A1 | 2/2018 | Clayton et al. | |
| 2018/0253462 A1* | 9/2018 | Dasgupta | G06F 11/0745 |

OTHER PUBLICATIONS

"International Search Report and Written Opinion Issued in PCT Application No. PCT/US2022/013963", dated Mar. 31, 2022, 11 Pages.
Rouillard, John P. , "Real-time Log File Analysis Using the Simple Event Correlator (SEC)", In Proceedings of the 18th Conference on Systems Administration, Nov. 14, 2004, pp. 133-150.

* cited by examiner

*Primary Examiner* — Taelor Kim
(74) *Attorney, Agent, or Firm* — Weaver IP L.L.C.

(57) ABSTRACT

Embodiments described herein are directed to detecting data inconsistencies within a distributed database and identifying the cause thereof. For example, lineage events are emitted from different components of the distributed system that operate on various data files. A consistency checking engine analyzes these events and detects inconsistencies with respect to the data files. The embodiments described herein checks the integrity of the database and assists in understanding the root cause in case of a corruption. Moreover, it provides the timeline for the corruption and whether it is repairable or not. These properties enable determining the right time to restore the customer's database or the right set of actions to repair the corruption. In case of repairable corruption, the correct compensating repair actions may be applied.

20 Claims, 12 Drawing Sheets

| Operation Type | Bulk Load | Merge | Recluster | Merge | Recluster | Garbage Collection |
|---|---|---|---|---|---|---|
| Actor | User Transaction | Re-cluster Process | Re-cluster Process | Re-cluster Process | Re-cluster Process | GC Service |
| Input Data File IDs | Null | 1, 2 | 3, 4 | 5, 6 | 7, 8 | 1 |
| Output Data File IDs | 1, 2, 3, 4 | 5 | 6, 7 | 8 | 9 | Null |
| Transaction Version | 2345 | 2645 | 2685 | 2745 | 2895 | 3095 |
| Operation Status | Success | Success | Success | Failed | Success | Success |

CONSISTENCY CHECKING FOR DISTRIBUTED ANALYTICAL DATABASE SYSTEMS

BACKGROUND

A distributed database is a database with set of interconnected storage and compute units that are distributed over one or more computer networks and/or the Internet. A Distributed Database Management System (DDBMS) manages the distributed database and provides mechanisms to make the databases transparent to the users. In these systems, data is intentionally distributed among multiple nodes to allow elasticity of compute or storage resources for easy scaling. A distributed database offers several advantages, such as, but not limited to, modular development, higher throughput, high concurrency and high scalability. However, distributed databases also require increased coordination among different components (or micro-services). As such, the probability of failure increases due to the increase in number of components required to implement the system. This increases the potential of data corruption. While the overall system is designed to prevent data corruption and (or) recover to a consistent state after random failures, in reality, data corruption can still occur due to various software bugs, faults, etc. Failing to timely detect, root cause and mitigate the data corruption seriously impacts the integrity of the query results and affects the availability of the database.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to detect data inconsistencies with respect to a table of a database and identify the cause of such data inconsistencies. In an analytical database system, the data is usually column-oriented, compressed and stored in chunks/files/rowgroups/partitions (referred herein as "data files"). The logical data within these data files is immutable and the system only allows the creation and dropping of an entire data file. The techniques described herein generally consist of two phases. In the first phase, lineage events/logs are emitted across different components of the distributed system that operate (creates/drops/removes) on the data files. In the second phase, a consistency checking engine analyzes these events and detects the inconsistencies.

In case of a lineage event validation failure, the following conclusions can be made immediately (a) there is a database corruption; (b) the operation and the component responsible for the corruption; (c) the time of the corruption; and/or (d) determine, by analyzing the remaining lineage events, whether the corrupted data has propagated to more data files to establish the overall extent of the corruption.

Determining the answers to these questions is critical to plan the mitigation course and determine the following: (a) determining the correct time to restore the customer database that avoids corruptions and minimize the data loss; (b) determine the type of wrong results experienced by the customer after corruption (e.g., determine whether it was a data loss or duplicate data; and/or (c) determine whether the corruption is repairable (that is, whether it is possible to recover all the customer data before and after the corruption is repairable (that is, whether it is possible to recover all the customer data before and after the corruption event).

In case of repairable corruption, a repair task may auto correct the corruption. The lineage event has enough data to facilitate creation of a compensating repair task corresponding to the operation that caused the corruption. In software as a service (SaaS) setting, the techniques described herein may be used by the service provider to provide integration guarantees for the database by periodically checking the database consistency.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

FIG. 3 depicts a plurality of event records in accordance with an example embodiment.

Figure 1:
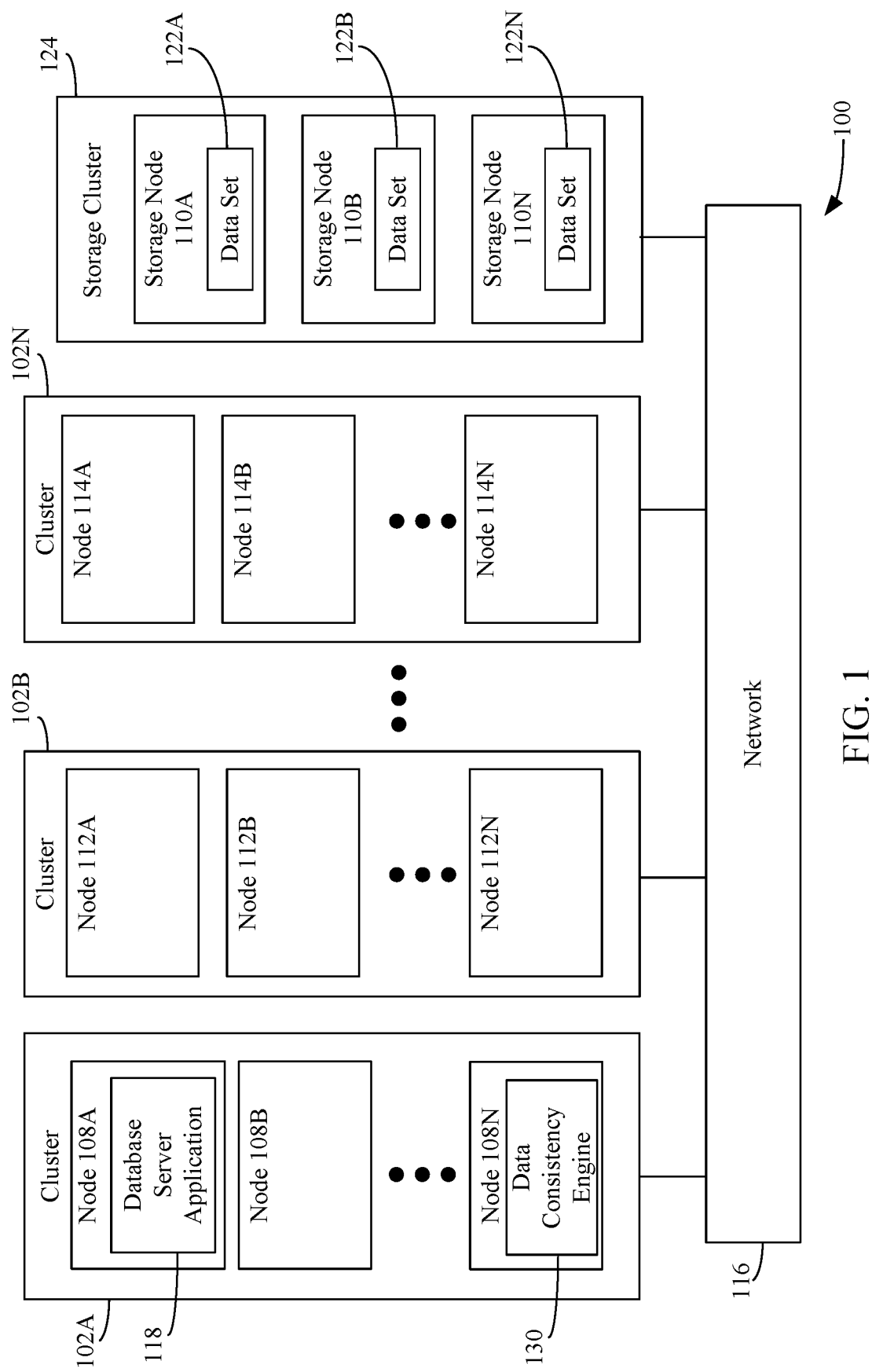
FIG. 1 shows a block diagram of an example network-based computing system configured to determine data inconsistencies in a database in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein are directed to detecting data inconsistencies with respect to a database and identifying the cause of such data inconsistencies. There are certain assumptions that are made about the database system which includes: most of the data is stored in immutable data files, data files could be created, copied, dropped (soft deleted) or deleted by different components in the distributed system, there is a global version/timestamp associated with each operation. These are reasonable assumptions for most distributed analytical database systems. The techniques described herein consists of two phases. During the first phase, lineage events are emitted from different components of the distributed system that operate on the data files. During the second phase, a consistency checking engine analyzes these events and detects the inconsistencies. The lineage event forms the record of the operation done on the data file and includes the following information a) the unique file identifiers (IDs) for data files that are input for the operation, b) the unique file IDs of the data files produced by the operation, c) type of the operation, d) the transaction version of the operation, e) the actor or the component, f) the time of the operation and/or g) the status of operation i.e., whether it was committed or not. Whenever a consistency check operation is initiated, the lineage event records are first ordered by their transaction version. Two sets are maintained while processing each event: a valid set, which tracks the data file IDs that should be visible until the currently processed event, and an invalid set, which tracks the data files IDs that should not be visible. Iteration is done over each event, starting from the event with lowest version and validating whether the input data file IDs belong to either the valid or invalid set based on the operation type. Post validation, the inputs and/or outputs of the operation are added to either the valid or invalid sets based on the side effect of the operation. Any contradiction observed during this validation process indicates a potential corruption. The consistency checking engine may evaluate the events periodically or on demand by including all the events up to a certain time in the past.

The foregoing techniques checks the integrity of the database and assists in understanding the root cause in case of a corruption. Moreover, it provides the timeline for the corruption and whether it is repairable or not. These properties are very valuable as they allow determining the right time to restore the customer's database or right set of actions to repair the corruption. In case of repairable corruption, the correct compensating repair actions may be applied. Still further, the foregoing techniques advantageously improves the integrity of the data maintained by the database, and therefore, ensures that applications accessing the database operate on the correct data. Lastly, the availability of the database is improved, as hardware and/or software failures that are normally attributed to data inconsistencies is reduced.

For example, FIG. 1 shows a block diagram of an example network-based computing system 100 configured to determine data inconsistencies in a database, according to an example embodiment. As shown in FIG. 1, system 100 includes a plurality of clusters 102A, 102B and 102N and a storage cluster 124. Each of clusters 102A, 102B and 102N and storage cluster 124 are communicatively coupled to each other via network 116. Network 116 may comprise one or more networks such as local area networks (LANs), wide area networks (WANs), enterprise networks, the Internet, etc., and may include one or more of wired and/or wireless portions.

Clusters 102A, 102B and 102N and/or storage cluster 124 may form a network-accessible server set (e.g., a cloud-based environment). Each of clusters 102A, 102B and 102N may comprise a group of one or more nodes (also referred to as compute nodes) and/or a group of one or more storage nodes. For example, as shown in FIG. 1, cluster 102A includes nodes 108A-108N, cluster 102B includes nodes 112A-112N, and cluster 102N includes nodes 114A-114N. Each of nodes 108A-108N, 112A-112N and/or 114A-114N are accessible via network 116 (e.g., in a "cloud-based" embodiment) to build, deploy, and manage applications and services. Storage cluster 124 comprises one or more storage nodes 110A-110N. Each of storage node(s) 110A-110N comprises a plurality of physical storage disks that are accessible via network 116 and is configured to store data associated with the applications and services managed by nodes 108A-108N, 112A-112N, and/or 114A-114N.

As shown in FIG. 1, storage node(s) 110A-110N comprise data sets 122A-122N, respectively. Each of data sets 122A-122N include databases and/or the like, in embodiments, which may be very large data sets such as for "Big Data" analytics and/or data warehousing. It is contemplated herein that one or more of data sets 122A-122N are to the order of petabytes, or more, in embodiments. Data sets 122A-122N may include a plurality of data files. The data files may comprise structured, relational data, organized as rows of tables, having columns for the data. Examples of data files include, but are not limited to, a database file, a chunk, a group of one or more rows of the table (i.e., a rowgroup), partitions, etc.).

In accordance with an embodiment, data sets 122A-122N are part of the same database that is distributed among storage node(s) 110A-110N. In accordance with such an embodiment, each of the data files may be immutable (i.e., the data files are not modifiable). Any requested modifications to a given data file are recorded and/or stored as a separate data file, where a copy of the data file (for which a modification is requested) is generated and the modifications are applied to the copy.

In an embodiment, one or more of clusters 102A, 102B and 102N and/or storage node(s) 110A-110N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 102A, 102B and 102N and/or storage node(s) 110A-110N may be a datacenter in a distributed collection of datacenters.

Each of node(s) 108A-108N, 112A-112N and 114A-114N may comprise one or more server computers, server systems, and/or computing devices. Each of node(s) 108A-108N, 112A-112N and 114A-114N may be configured to execute one or more software applications (or "applications") and/or services and/or manage hardware resources (e.g., processors, memory, etc.), which may be utilized by users (e.g., customers) of the network-accessible server set. Node(s) 108A-108N, 112A-112N and 114A-114N may also be configured for specific uses. For example, as shown in FIG. 1, node 108A may be configured to execute a database server application 118 and node 108N may be configured to execute a data consistency engine 130. It is noted that instances of database server application 118 and/or data consistency engine 130 may be executing on other node(s) (e.g., node(s) 108B-108N, node(s) 112A-112N, and/or node(s) 114A-114N) in lieu of or in addition to nodes 102A and 108N, respectively. It is further noted that data consistency engine 130 may be incorporated in another application, such as database server application 118.

Node 108A (or any other node executing an instance of database server application 118) may be a control node configured to act as the query endpoint for incoming queries, to produce a distributed plan for an incoming query, and to divide work for query processing among one or more of compute nodes 108B-108N, nodes 112A-112N, and nodes 114A-114N. That is, according to embodiments, node 108A is configured to transform an incoming query into a set of queries that are run against each distribution of a data set in parallel via one or more of nodes 108B-108N, nodes 112A-112N, and nodes 114A-114N.

Database server application 118 may be any database server application, including, but not limited to Microsoft® Azure SQL Database™ published by Microsoft® Corporation of Redmond, Washington. Database server application 118 is configured to execute statements to create, modify, and delete one or more data files of tables of data, indexes, and relationships in data set(s) 122A-122N, e.g., based on an incoming query.

Queries may be user-initiated or automatically generated by one or more background processes. Such queries may be configured to add data file(s), copy data file(s), merge data file(s) into a larger data file, re-organize (or re-cluster) data file(s) (e.g., based on a commonality of data file(s)) within a particular set of data files, delete data file(s) (e.g., via a garbage collection process that deletes unwanted or obsolete data), etc.

Over time, data file(s) of data sets 122A-122N may become corrupt or inconsistent due to hardware issues, software bugs, faults, etc. Data consistency engine 130 is configured to detect whether a data inconsistency exists with respect to data file(s) of a table maintained by data sets 122A-122N and identify one or more database operations and/or the initiator of such operation(s) that caused the data inconsistency. For instance, data consistency engine 130 may periodically obtain all lineage event records associated with a particular table maintained by data sets 122A-122N and order them by transaction version. Each event record includes information about a particular operation performed with respect to data file(s) of the table. The information for a particular operation may include a transaction version, an operation type, a set of input data file identifiers (identifiers of data files inputted or acted on by the operation), a set of output data file identifiers (identifiers of data files outputted by the operation), an actor (or source) of the operation, the time of operation and an operation status.

For each event record, data consistency engine 130 determines whether the operation associated therewith was successful or unsuccessful based on the operation status associated with the event record or by looking up the status of the transaction version. In response to a determination that the operation associated with the event record was successful, any data file identifier in the set of output data file identifiers associated with the event record are designated as being part of a valid data file set. Data files identified as being part of the valid data file represent data files on which subsequent operations may operate (i.e., such data files are valid/visible within the database). Data consistency engine 130 also designates any data file identifier included in the set of input data file identifiers associated with the event record that is already included in the valid data file set as being part of an invalid data file set. That is, data file identifiers that are already included in the valid data file set are moved to the invalid data file set. Data files identified as being part of the invalid data file represent data files that should no longer be used by subsequent operations. Such data files should be eventually deleted at some point, for example, by a garbage collection process.

In response to a determination that the operation was unsuccessful (e.g., the operation has failed), data consistency engine 130 designates any data file identifier in the set of output data file identifiers associated with the event record as being part of the invalid data file set.

After designating data file identifiers for a particular event record as being part of a valid data file set or an invalid data file, data consistency engine 130 determines whether a data consistency exists with respect to the table based on analysis of a subsequent event records in the ordered sequence that follows the particular event record. In particular, data consistency engine 130 selects a data consistency rule based on the operation and applies the selected data consistency rule to the current valid data file set, the current invalid data file set, and the set of input data file identifiers and/or set of output data file identifiers of the subsequent event record. The selected data consistency rule is configured to determine whether a data inconsistency exists based on its application to the current valid data file set, the current invalid data file set, and the set of input data file identifiers and/or set of output data file identifiers of the subsequent event record.

In response to determining that a data inconsistency exists, data consistency engine 130 may automatically perform a remediation of the data inconsistency if it is repairable. For example, data consistency engine 130 cause a data file that was inadvertently deleted to be recovered, e.g., restoring the data files marked for deletion if they are not garbage collected yet. In another example, data consistency engine 130 may cause a problematic data file from a data set of data sets 122A-122N in which it is included to be removed (or deleted), for example, to ensure that a data file created by a failed operation is not carried forward as an input to subsequent operations. In yet another example, data consistency 130 may cause one or more operations to be rolled back to a point before the data inconsistency occurred.

Figure 2:
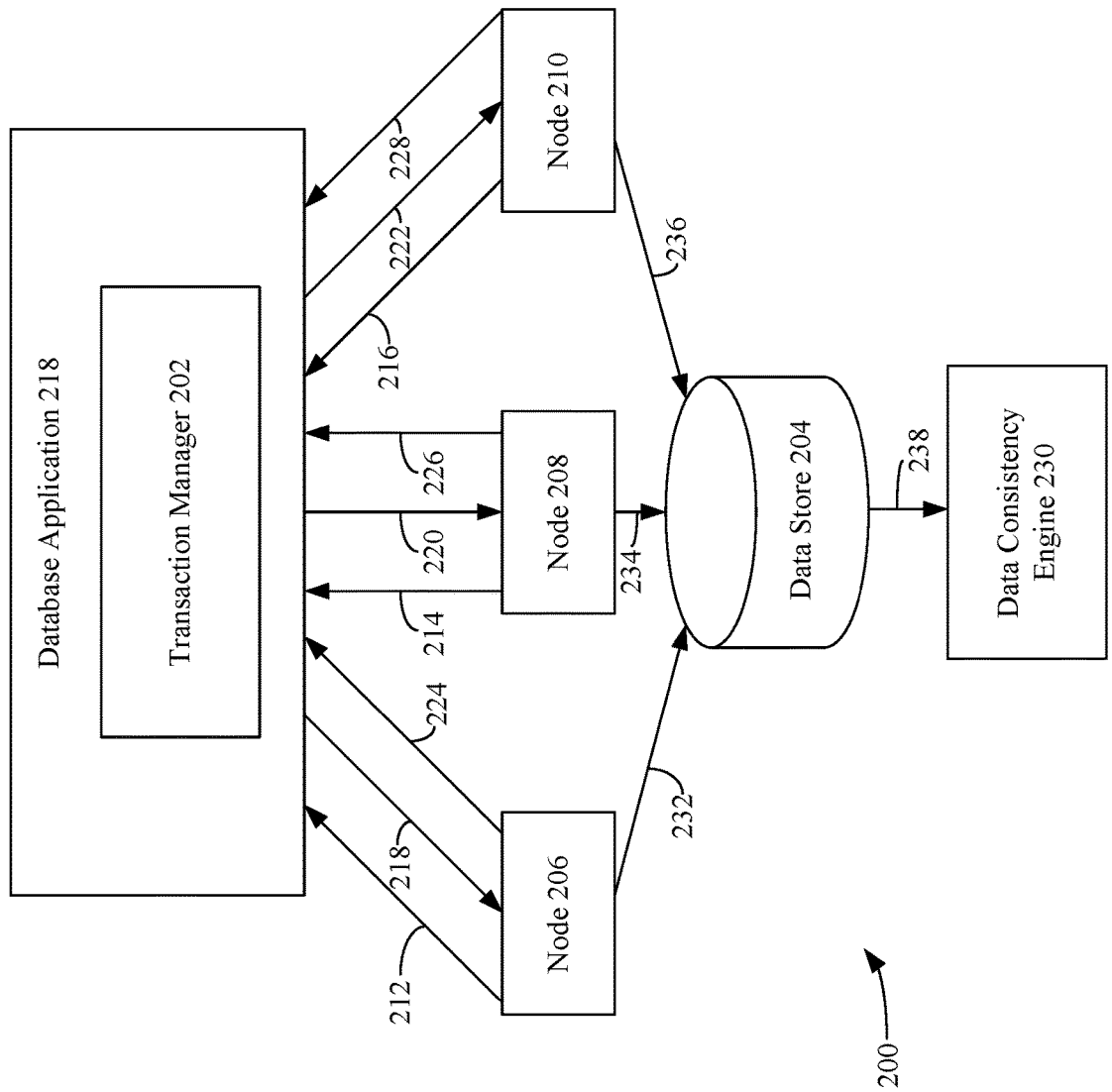
FIG. 2 depicts a block diagram of a system for obtaining event records in accordance with an example embodiment.

FIG. 2 depicts a block diagram of a system 200 for obtaining event records in accordance with an example embodiment. As shown in FIG. 2, system 200 comprises a database application 218, a data consistency engine 230, a data store 204, a node 206, a node 208, and a node 210. Database application 218 is an example of database application 118, as described above with reference to FIG. 1. Data consistency engine 230 is an example of data consistency engine 130, as described above with reference to FIG. 1. Nodes 206, 208, and 210 are examples of any of nodes 108A-108N, nodes 112A-112N, or nodes 114A-114N. Database application 218 and data consistency engine 230 may execute on one or more of nodes 108A-108N, nodes 112A-112N, or nodes 114A-114N.

Each of nodes 206, 208, and 210 may be configured to perform an operation with respect to data file(s) of a data set (e.g., data set(s) 122A-122N). Examples of operations include, but are not limited to, user-initiated operations (e.g., a load operation (e.g., that stores new data file(s) into a data set), a merge operation (that merges the contents of two or more data file(s) and stores the contents into a new data file), etc. or a background process, such as, but not limited to, a garbage collection process, a re-clustering process, a re-indexing process, etc.

Data store 204 may be any type of physical memory and/or storage device that is described herein, and/or as would be understood by a person of skill in the relevant art(s) having the benefit of this disclosure. Data store 204 may be included in and/or distributed among any of storage nodes 110A-110N or any memory or storage device maintained by node(s) of nodes 108A-108N, nodes 112A-112N, or nodes 114A-114N, as described above with reference to FIG. 1.

As shown in FIG. 2, database application 218 may comprise a transaction manager 202. Transaction manager 202 is configured to coordinate the database operations to be performed by nodes 206, 208, and 210. To perform an operation, a node may issue a request to transaction manager 202. For example, node 206 may issue a request 212 to transaction manager, node 208 may issue a request 214, and node 210 may issue a request 216.

Responsive to receiving request 212, transaction manager may issue a unique transaction version to node 206, for example, via a response 218. Responsive to receiving request 214, transaction manager may issue a unique transaction version to node 208, for example, via a response 220. Responsive to receiving request 216, transaction manager may issue a unique transaction version to node 210, for example, via a response 222. The transaction version provided to one of nodes 206, 208, and 210 may comprise a number or timestamp that uniquely identifies the transaction. For each subsequent request, the transaction version is incremented such that is greater than the previous transaction version.

Responsive to receiving response 218, node 206 performs its operation with respect to the data set. After the operation is performed, node 206 attempts to commit the operation. Node 206 provides an indicator 224 to transaction manager 202 that specifies whether the commit was successful or whether it was unsuccessful.

Responsive to receiving response 220, node 208 performs its operation with respect to the data set. After the operation is performed, node 208 attempts to commit the operation. Node 208 provides an indicator 226 to transaction manager 202 that specifies whether the operation was successfully committed or not.

Responsive to receiving response 222, node 210 performs its operation with respect to the data set. After the operation is performed, node 210 attempts to commit the operation. Note 210 provides an indicator 228 to transaction manager 202 that specifies whether the operation was successfully committed or not.

After the operations performed by a respective node of nodes 206, 208, and 210 are finished (whether they completed successfully or unsuccessfully), the respective node may store information pertaining to the operation in data store 204 as an event record. For example, node 206 may store information 232 in data store 204 as a first event record, node 208 may store information 234 in data store 204 as a second event record, and node 210 may store information 236 in data store 204 as a third event record.

Examples of information 232 include, but are not limited to, the transaction version assigned to node 206, an operation type (e.g., a merge operation, a load operation, a re-cluster operation, a garbage collection operation, etc.), a set of input data file identifier(s) that identify data file(s) acted on by the operation performed by node 206, a set of output data file identifier(s) that identify data file(s) generated by the operation performed by node 206, the time of the operation, an operation status (e.g., an indication as to whether the operation performed by node 206 completed successfully or unsuccessfully), and/or an actor or source of the operation (e.g., an identification of the node that issued the operation or an identifier of a user or application that issued the operation).

Examples of information 234 include, but are not limited to, the transaction version assigned to node 208, an operation type (e.g., a merge operation, a load operation, a re-cluster operation, a garbage collection operation, etc.), a set of input data file identifier(s) that identify data file(s) acted on by the operation performed by node 208, a set of output data file identifier(s) that identify data file(s) generated by the operation performed by node 208, the time of the operation, and/or an operation status (e.g., an indication as to whether the operation performed by node 208 completed successfully or unsuccessfully).

Examples of information 236 include, but are not limited to, the transaction version assigned to node 210, an operation type (e.g., a merge operation, a load operation, a re-cluster operation, a garbage collection operation, etc.), a set of input data file identifier(s) that identify data file(s) acted on by the operation performed by node 201, a set of output data file identifier(s) that identify data file(s) generated by the operation performed by node 210, the time of the operation, and/or an operation status (e.g., an indication as to whether the operation performed by node 210 completed successfully or unsuccessfully).

Data consistency engine 230 is configured to obtain the event records (shown as event records 238) for a given table from data store 204. For example, data consistency engine 230 may be configured to periodically retrieve records 238 from data store 204. Alternatively, event records 238 may be periodically pushed to data consistency engine 230.

After retrieving event records 238, data consistency engine 230 sorts event records 238 in sequential order based on the transaction version included in each of event records 238. After sorting event records 238, data consistency engine 230 determines whether a data inconsistency exits with respect to the table. Additional details regarding data inconsistency determination are described below.

It is noted that certain information included in event records 238 may not be provided by nodes 206, 208, and/or 210. For example, the operation status may not be provided by nodes 206, 208, and/or 210. In this example, to obtain the operation status, data consistency engine 230 may query transaction manager 202, obtain the operation status therefrom, and incorporate the operation status into event records 238 obtained from data store 204.

FIG. 3 depicts a plurality of event records 302, 304, 306, 308, 310, and 312 in accordance with an embodiment. Each of event records 302, 304, 306, 308, 310, and 312 comprises a plurality of fields. Each field stores a piece of information pertaining to an operation represented by the associated event record. For example, each of event records 302, 304, 306, 308, 310, and 312 may comprise an operation type field, an actor filed, an input data file identifier field, an output data file identifier field, a transaction version field, and an operation status field. The operation type field of a particular event record specifies the type of operation represented by the event record. The actor field of a particular event record specifies the actor or source of the operation represented by the event record. The input data file identifier field identifies the data file(s) acted on or utilized by the operation represented by the event record. The output data file identifier field identifies the data file(s) generated by the operation represented by the event record. The transaction version field specifies the transaction version associated with the operation represented by the event record. The operation status field identifies the operation status of the operation represented by the event record.

As shown in FIG. 3, the operation type field of event record 302 specifies that the operation is a bulk load operation, the actor field of event record 302 specifies that the bulk load operation originated from a user transaction, the input data file identifier field of event record 302 specifies that no data file(s) were acted on by the bulk load operation, the output data file identifier field of event record 302 specifies that data files 1, 2, 3, and 4 were generated by the bulk load operation, the transaction version field of event record 302 specifies that the transaction version of the bulk load operation is 2345, and the operation status field of event record 302 specifies that the bulk load operation was successful.

The operation type field of event record 304 specifies that the operation is a merge operation, the actor field of event record 304 specifies that the merge operation originated from a re-cluster process, the input data file identifier field of event record 304 specifies that data file 1 and 2 were acted on by the bulk load operation, the output data file identifier field of event record 304 specifies that data file 5 was generated by the merge operation (i.e., the contents of data files 1 and 2 were merged together and stored as newly-generated data file 5), the transaction version field of event record 304 specifies that the transaction version of the merge operation is 2645, and the operation status field of event record 304 specifies that the merge operation was successful.

The operation type field of event record 306 specifies that the operation is a re-cluster operation, the actor field of event record 306 specifies that the re-cluster operation originated from a re-cluster process, the input data file identifier field of event record 302 specifies that data files 3 and 4 were acted on by the re-cluster operation, the output data file identifier field of event record 306 specifies that data files 6 and 7 were generated by the re-cluster operation (i.e., the contents data files 3 and 4 were re-organized into newly-generated data files 6 and 7), the transaction version field of event record 306 specifies that the transaction version of the re-cluster operation is 2685, and the operation status field of event record 306 specifies that the re-cluster operation was successful.

The operation type field of event record 308 specifies that the operation is a merge operation, the actor field of event record 308 specifies that the re-cluster operation originated from a re-cluster process, the input data file identifier field of event record 308 specifies that data files 5 and 6 were acted on by the re-cluster operation, the output data file identifier field of event record 308 specifies that data file 8 was generated by the merge operation (i.e., the contents data files 5 and 6 were merged and stored into newly-generated data file 8), the transaction version field of event record 308 specifies that the transaction version of the re-cluster operation is 2745, and the operation status field of event record 308 specifies that the merge operation was unsuccessful.

The operation type field of event record 310 specifies that the operation is a re-cluster operation, the actor field of event record 310 specifies that the re-cluster operation originated from a re-cluster process, the input data file identifier field of event record 310 specifies that data files 7 and 8 were acted on by the re-cluster operation, the output data file identifier field of event record 310 specifies that data file 9 was generated by the re-cluster operation (i.e., the contents data files 7 and 8 were re-organized into newly-generated data file 9), the transaction version field of event record 310 specifies that the transaction version of the re-cluster operation is 2895, and the operation status field of event record 310 specifies that the re-cluster operation was successful.

The operation type field of event record 312 specifies that the operation is a garbage collection operation, the actor field of event record 312 specifies that the garbage collection operation originated from a garbage collection process, the input data file identifier field of event record 312 specifies that data file 1 was acted on by the garbage collection operation (i.e., data file 1 was deleted by the garbage collection process), the output data file identifier field of event record 312 specifies that no data files were generated by the garbage collection operation, the transaction version field of event record 312 specifies that the transaction version of the garbage collection operation is 3095, and the operation status field of event record 312 specifies that the garbage collection operation was successful.

As described above with reference to FIG. 2, data consistency engine 230 may obtain event records 302, 304, 306, 308, 310, and 312 (e.g., from data store 204) and sort event records 302, 304, 306, 308, 310, and 312 in sequential order based on the transaction versions specified in the transaction version fields. In the example shown in FIG. 3, event records 302, 304, 306, 308, 310, and 312 have already been sorted in sequential order by data consistency engine 230. As further described above, the operation status field may be populated by the node (e.g., node 206, 208 or 210) that provided the information provided to data store 204, or alternatively, data consistency engine 230 may populate the operation status field by querying transaction manager 202 for the operation status of a particular operation. Data consistency engine 230 may specify the transaction version in the query, and transaction manager 202 may look up the operation status based on the transaction version.

Data consistency engine 230 may analyze each of event records 302, 304, 306, 308, 310, and 312 in sequential order. When analyzing a first event record of event records 302, 304, 306, 308, 310, and 312, data consistency engine 230 determines whether the input data file identifiers (specified in the input data file identifier field) or the output data file identifiers (specified in the output data file identifier field) are to be designated as being either in a valid data file set or an invalid data file set. For example, data consistency engine 130 may first determine whether the operation associated with the first event record was successful or unsuccessful based on the operation status specified in the operation status field of the first event record. In response to a determination that the operation associated with the event record was successful, any output data file identifier specified by the output data file identifier field of the event record are designated as being part of a valid data file set. Data files identified as being part of the valid data file represent data files on which subsequent operations may operate (i.e., such data files are valid within the database). Data consistency engine 230 also designates any input data file identifier specified by the input data file identifier field of the event record that is already included in the valid data file set as being part of an invalid data file set. That is, data file identifiers that are already included in the valid data file set are moved to the invalid data file set. Data files identified as being part of the invalid data file represent data files that should no longer be used by subsequent operations. Such data files should be eventually deleted at some point.

In response to a determination that the operation was unsuccessful (e.g., the operation failed), data consistency engine 230 designates any output data file identifier identified by the output data file identifier field of the event record as being part of the invalid data file set.

Data consistency engine 230 then analyzes the next event record in sequential order and selects and applies a data consistency rule based on the operation type of the next event record. Data consistency engine 230 determines whether a data inconsistency exists based on the application of the selected data consistency rule with respect to the valid data file set, the invalid data file set, and/or the information of the next event record.

Each operation type may be associated with a respective data consistency rule. For example, a bulk load operation may be associated with a first data inconsistency rule. The first data inconsistency rule may specify that the output data files identifiers of the event record associated with the bulk load operation should not be part of either the invalid data file set or the valid data file set before the bulk load operation takes place (i.e., the data files generated by the bulk load operation should be new data files that were not previously in the database). A garbage collection operation may be associated with a second data inconsistency rule. The second data inconsistency rule may specify that the input data file identifiers of the event record associated with the garbage collection operation should be part of the invalid data file set before the garbage collection process takes place (that is, the data files that were deleted by the garbage collection should no longer be valid in the database, and therefore, be designated as being part of the invalid data file set). The merge and re-cluster operations may be associated with a third data inconsistency rule. The third data inconsistency rule may specify that the input data file identifiers of the event record associated with the merge or re-cluster operation should be part of the valid data file set before the merge or re-cluster operation takes place. It is noted that data inconsistency engine 230 may utilize other rules for other types of operations and that the rules specified above are purely exemplary.

It is further noted that in certain embodiments, the event records maintained by data store 204 and data consistency engine 230 have a finite retention period or there is the possibility of missing events due to failures. The embodiments described herein may be extended to handle a partial set of event records by utilizing a different set of data inconsistency rules. The rules may be grouped into two types a strong rule and a weak rule. A strong rule would identify most types of inconsistencies but is ideal if a complete set of event records is maintained (e.g., there is no finite retention period or there are strong guarantees around the delivery of event records). A weak rule would miss certain inconsistencies but could be utilized with a partial set of event records. The first three data inconsistency rules described above are examples of strong rules.

A first example of a weak data inconsistency rule would be a rule that determines whether data files generated by aborted (or failed) operations and included in the invalid data file set are utilized by subsequent operations. If a subsequent operation utilizes such data files, then a data inconsistency with respect to such data files is determined.

A second example of a weak data inconsistency rule would be a rule that determines whether data files dropped (or deleted) by an operation and included in the invalid data file set are utilized by subsequent operation. If a subsequent operation utilizes such data files, then a data inconsistency with respect to such data files is determined.

A third example of a weak data inconsistency rule would be a rule that determines whether data files collected (or deleted) by a garbage collection are included in a valid data file set. If such data files are included in a valid data file set, then a data inconsistency exists with respect to such data files.

A fourth example of a weak data inconsistency rule would be a rule that determines whether data files utilized for a particular operation are included in an invalid data file set. If such data files are included in an invalid data file set, then a data inconsistency exists with respect to such data files.

Data consistency engine 230 may determine whether any of the input data file(s) or output data file(s) described above are inconsistent based on the application of such rules, which is performed iteratively through each of event records 302, 304, 306, 308, 310, and 312. It is noted that that data consistency engine 230 may apply such rules with respect to any number of event records.

Figure 4:
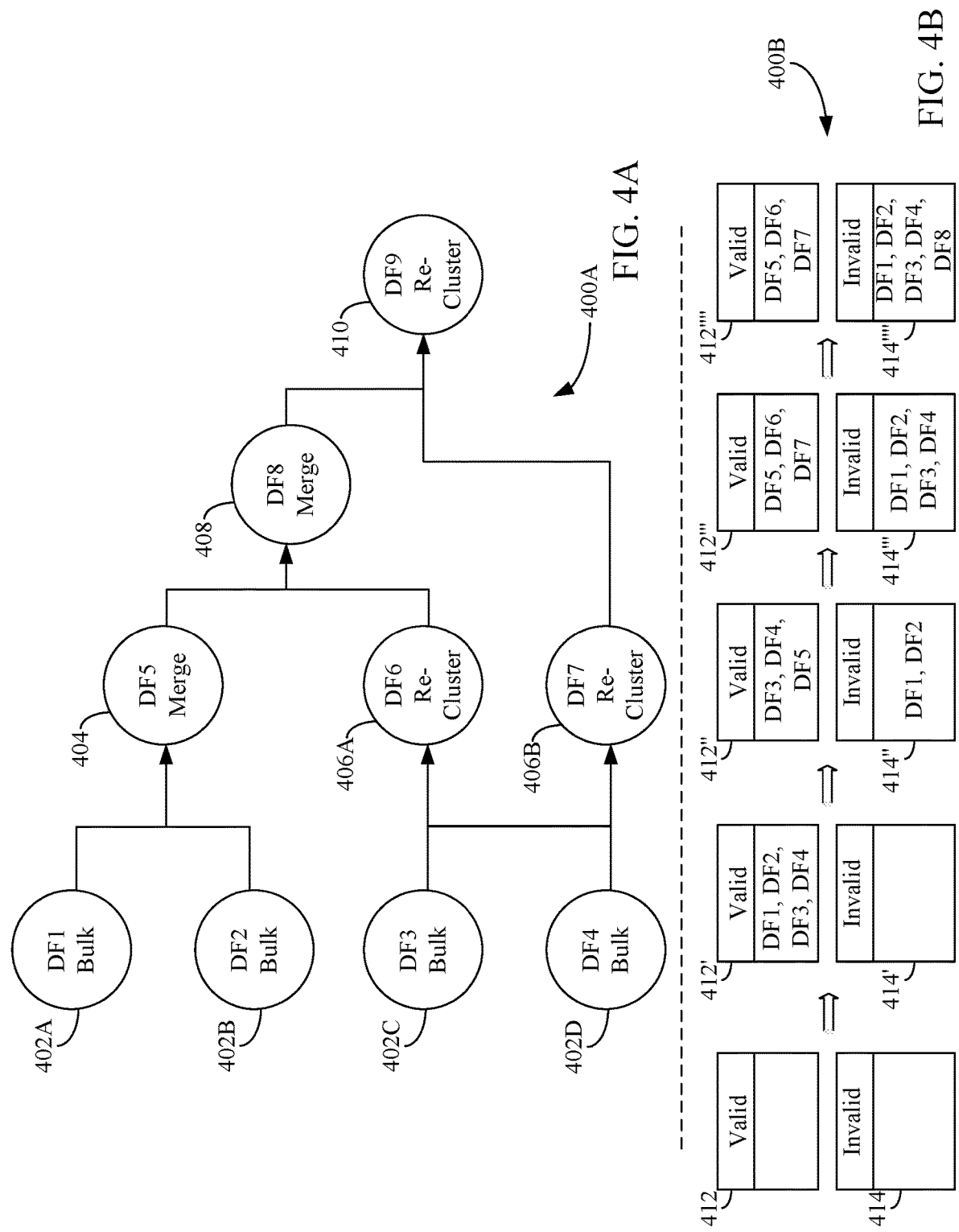
FIG. 4A depicts a graph depicting event records and the dependencies therebetween in accordance with an example embodiment.
FIG. 4B depicts a block diagram representing changes made to a valid data file set and an invalid data file set during data inconsistency analysis in accordance with an example embodiment.

FIG. 4A depicts a graph 400 depicting event records 302, 304, 306, 308, and 310 and the dependencies therebetween in accordance with an example embodiment. FIG. 4B depicts a block diagram representing changes made to a valid data file set 412 and an invalid data file set 414 during data inconsistency analysis in accordance with an example embodiment. The analysis performed by data consistency engine 230 will now be described with reference to FIGS. 2-4B. As shown in FIG. 4A, graph 400 comprises nodes 402A-402D, 404, 406A, 406B, 408, and 410. Nodes 402A-402D are representative of output data files 1-4, which are generated by the bulk load operation represented by event record 302, as shown in FIG. 3. Node 404 is representative of data file 5. Data file 5 is generated as a result of merging the contents of data files 1 and 2 (represented by nodes 402A and 404B), as specified by event record 304. Nodes 406A and 406B are representative of data files 6 and 7. Data files 6 and 7 are generated as a result of the re-clustering operation performed with respect to data files 3 and 4, as specified by event record 306. Node 408 is generated as a result of merging the contents of data files 5 and 6 (represented by nodes 404 and 406A), as specified by event record 308. Node 410 is representative of data file 9, which is generated as a result of the re-clustering operation performed with respect to data files 7 and 8, as specified by event record 310.

As shown in FIG. 4B, valid data file set 412 and invalid data file set 414 are initially empty, although the examples described herein are not so limited. Data consistency engine 230 analyzes event record 302 and determines the operation type, e.g., by reading the operation type field of event record 302. In this example, data consistency engine 230 determines that event record 302 is associated with a bulk load operation. As a result, data consistency engine 230 selects the first data consistency rule. Data consistency engine 230 applies the first data consistency rule with respect to event record 302 to determine whether data files 1-4 (specified in the output data file identifier field of event record 302) are included in either valid data file set 412 or invalid data file set 414. In this example, since both data sets 412 and 414 are empty, data consistency engine 230 determines that no data inconsistency exists.

Data consistency engine 230 also determines whether the bulk load operation of event record 302 was successful. For instance, data consistency engine 230 reads the operation status field of event record 302 and determines that the bulk load operation was successful. Data consistency engine 230 also reads the output data file identifier field of event record 302 to determine the data files generated by the bulk load operation (i.e., data files 1-4). Data consistency engine 230 designates output data file identifiers 1-4 as being part of valid data file set 412. As shown in FIG. 4B, data files 1-4 are now included in the valid data file set (shown as valid data file set 412').

Next, data consistency engine 230 analyzes event record 304 and determines the operation type. In this example, data consistency engine 230 determines that event record 304 is associated with a merge operation. As a result, data consistency engine 230 selects the third data inconsistency rule. Data consistency engine 230 applies the third inconsistency rule with respect to event record 304 to determine whether data files 1 and 2 (as specified in the input data file identifier field of event record 302) are included in valid data file set 412'. In this example, since valid data file set 412' comprises data file identifiers for data files 1 and 2, data consistency engine 230 determines that no data inconsistency exists.

Data consistency engine 230 also determines whether the merge operation of event record 302 was successful. For instance, data consistency engine 230 reads the operation status field of event record 304 and determines that the merge operation was successful. As a result, data consistency engine 230 reads the input data file identifier field of event record 304 to determine the data file acted on by the merge operation (i.e., data file identifiers 1 and 2). Data consistency engine 230 designates data file identifiers 1 and 2 as now being part of invalid data file set (shown as invalid data file set 414"). Data consistency engine 230 also reads the output data file field of event record 304 to determine the data file(s) generated by the merge operation (i.e., data file 5). Data consistency engine 230 designates data file identifier 5 as being part of the valid data file set (shown as valid data file set 412").

Next, data consistency engine 230 analyzes event record 306 and determines the operation type. In this example, data consistency engine 230 determines that event record 306 is associated with a re-cluster operation. As a result, data consistency engine 230 selects the third data inconsistency rule. Data consistency engine 230 applies the third inconsistency rule with respect to event record 306 to determine whether data files 3 and 4 (as specified in the input data file identifier field of event record 306) are included in valid data file set 412". In this example, since valid data file set 412" comprises data file identifiers for data files 3 and 4, data consistency engine 230 determines that no data inconsistency exists.

Data consistency engine 230 also determines whether the re-cluster operation of event record 306 was successful. For instance, data consistency engine 230 reads the operation status field of event record 306 and determines that the re-cluster operation was successful. As a result, data consistency engine 230 reads the input data file identifier field of event record 306 to determine the data files acted on by the re-cluster operation (i.e., data file identifiers 3 and 4). Data consistency engine 230 designates data file identifiers 3 and 4 as now being part of invalid data file set (shown as invalid data file set 414'"). Data consistency engine 230 also reads the output data file field of event record 304 to determine the data file(s) generated by the merge operation (i.e., data files 6 and 7). Data consistency engine 230 also designates data file identifiers 6 and 7 as being part of the valid data file set (shown as valid data file set 412'").

Next, data consistency engine 230 analyzes event record 308 and determines the operation type. In this example, data consistency engine 230 determines that event record 308 is associated with a merge operation. As a result, data consistency engine 230 selects the third data inconsistency rule. Data consistency engine 230 applies the third inconsistency rule with respect to event record 308 to determine whether data files 5 and 6 (as specified in the input data file identifier field of event record 308) are included in valid data file set 412'". In this example, since valid data file set 412'" comprises data file identifiers for data files 5 and 6, data consistency engine 230 determines that no data inconsistency exists.

Data consistency engine 230 also determines whether the merge operation of event record 308 was successful. For instance, data consistency engine 230 reads the operation status field of event record 308 and determines that the re-cluster operation was unsuccessful. As a result, data consistency engine 230 reads the output data file identifier field of event record 308 to determine the data file generated (incorrectly) by the merge operation (i.e., data file identifier 8). Data consistency engine 230 designates data file identifier 8 as being part of the invalid data file set (shown as invalid data file set 414"").

Next, data consistency engine 230 analyzes event record 310 and determines the operation type. In this example, data consistency engine 230 determines that event record 310 is associated with a re-cluster operation. As a result, data consistency engine 230 selects the third data inconsistency rule. Data consistency engine 230 applies the third inconsistency rule with respect to event record 310 to determine whether data files 7 and 8 (as specified in the input data file identifier field of event record 310) are included in valid data file set 412"". In this example, since data file identifier 8 is included not included in valid data file set 412"" (and is instead included in invalid data file set 414""), data consistency engine 230 determines that there is a data inconsistency with respect to data file 8. Data consistency engine 230 also identifies the operation and/or actor that caused the inconsistency. For example, data consistency engine 230 may read the operation type and/or actor fields of the event record via which the inconsistency was detected (i.e., event record 310) to identify the operation and/or actor that caused the inconsistency.

In response to finding such a data inconsistency, data consistency engine 230 may perform an operation to automatically remediate the data inconsistency. For example, data consistency engine 230 may send a request to transaction manager 202 that causes transaction manager 202 rollback the operations to a point before the merge operation represented by node 408 and/or causes data file 8 to be deleted after the merge operation is re-performed.

Figure 5:
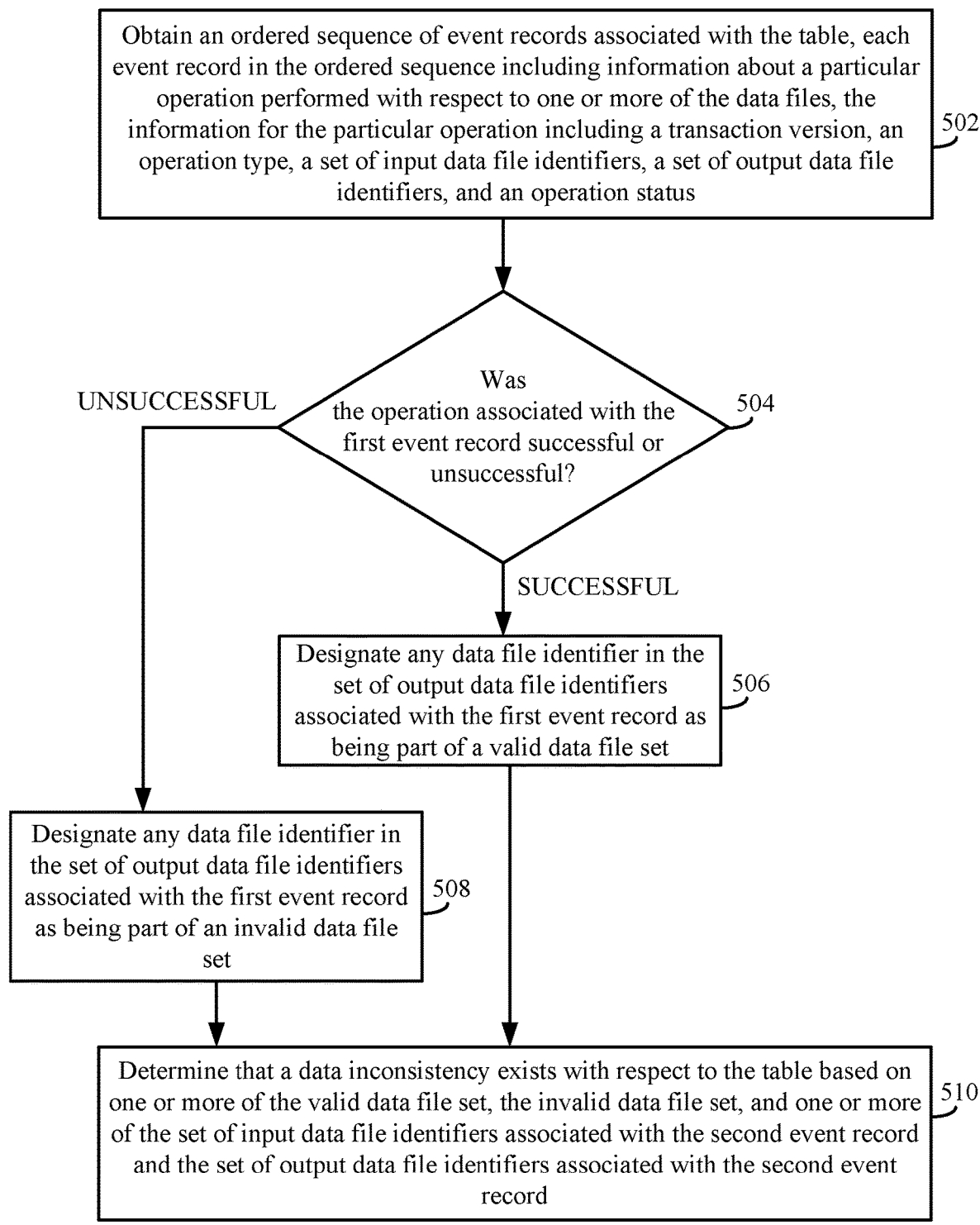
FIG. 5 shows a flowchart of a method for consistency checking of data files, in a distributed database system, that represent a table in accordance with an example embodiment.
Figure 6:
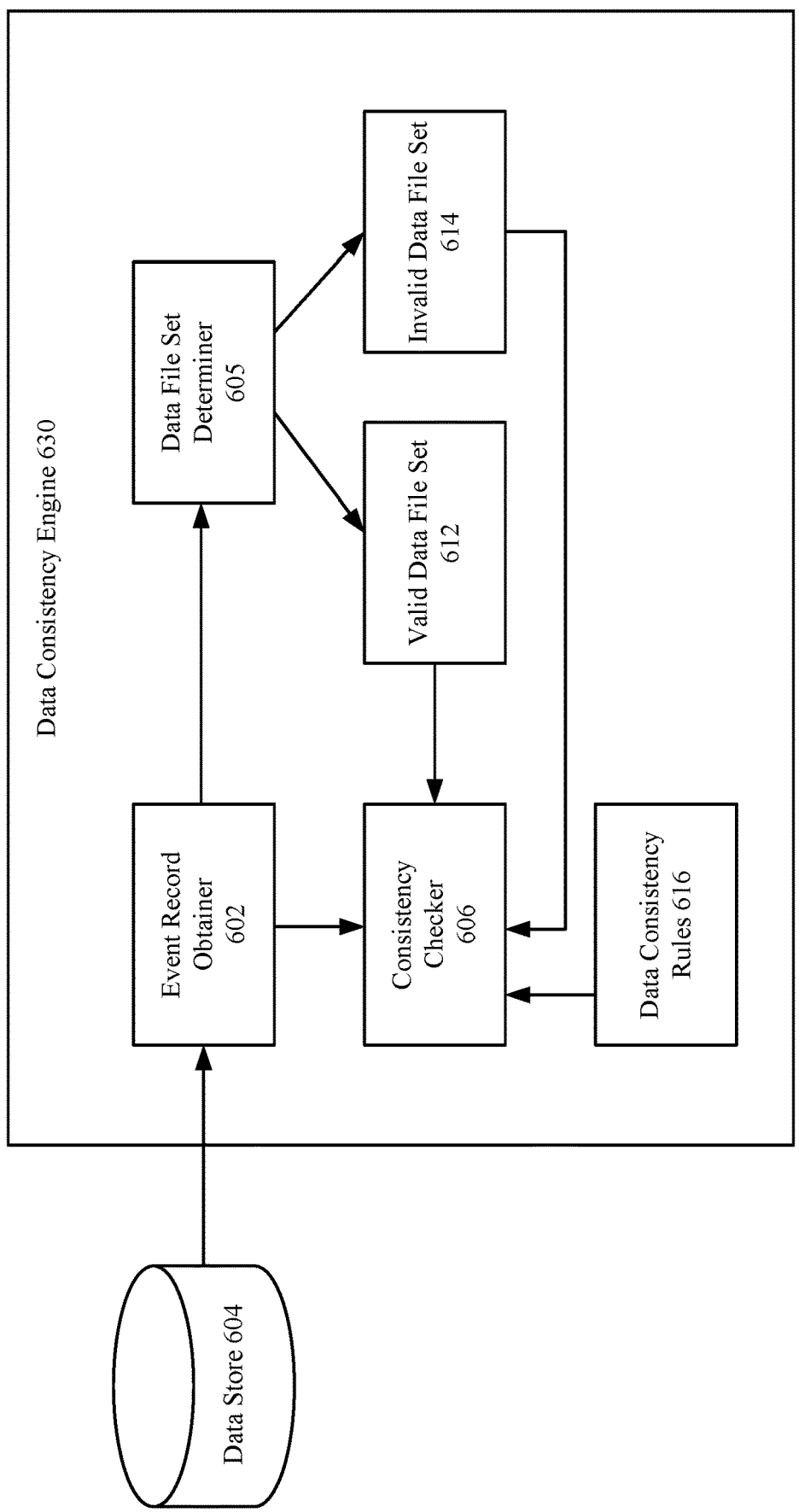
FIG. 6 depicts a block diagram of a data consistency engine in accordance with an example embodiment.

Accordingly, a consistency checking of data files represented by a table may be implemented in many ways. For example, FIG. 5 shows a flowchart 500 of a method for consistency checking of data files, in a distributed database system, that represent a table in accordance with an example embodiment. In an embodiment, flowchart 500 may be implemented by a system 600 shown in FIG. 6, although the method is not limited to that implementation. Accordingly, flowchart 500 will be described with reference to FIG. 6. As shown in FIG. 6, system 600 comprises a data store 604 and a data consistency engine 630. Data store 604 and data consistency engine 630 are examples of data store 204 and data consistency engine 230, as respectively described above with reference to FIG. 2. Data consistency engine 630 comprises an event record obtainer 602, a data file set determiner 605, a consistency checker 606, a valid data file set 612, an invalid data file set 614, and data consistency rules 616. Valid data file set 612 and invalid data file set 614 are examples of valid data file set 412 and invalid data file set 414, as described above with reference to FIG. 4. Other structural and operational embodiments will be apparent to persons skilled in the relevant art(s) based on the discussion regarding flowchart 500 and system 600 of FIG. 6.

Flowchart 500 begins with step 502. In step 502, an ordered sequence of event records associated with table is obtained. Each event record in the ordered sequence includes information about a particular operation performed with respect to one or more of the data files, the information for the particular operation including a transaction version, an operation type, a set of input data file identifiers, a set of output data file identifiers, and an operation status. For example, with reference to FIG. 6, event record obtainer 602 of data consistency engine 630 may obtain event records from data store 604. The event records are provided to data file set determiner 605 and consistency checker 606.

In accordance with one or more embodiments, the event records are obtained from the data store 604 as an unordered sequence, and the event records are organized in the ordered sequence based on the transaction versions associated therewith. For example, with reference to FIG. 6, event record obtainer 602 may obtain the event records from data store 604 as an unordered sequence and organize the event records in the ordered sequence based on the transaction versions associated therewith.

The following steps 504, 506, and 508 are performed for each of one or more first event records in the ordered sequence in the order specified by the ordered sequence. At step 504, a determination is made as to whether the operation associated with the first event record was successful or unsuccessful based on the operation status associated with the first event record. In the event that the operation was successful, flow continues to step 506. Otherwise, flow continues to step 508. For example, with reference to FIG. 6, data file set determiner 605 determines whether the operation associated with the first event record was successful or unsuccessful based on the operation status associated with the first event record. For instance, data file set determiner 605 may read the operation status field of the first event record (as described above with reference to FIG. 3) to determine whether the operation was successful or unsuccessful.

At step 506, any data file identifier in the set of output data file identifiers associated with the first event record are designated as being part of a valid data file set. For example, with reference to FIG. 6, data file set determiner 605 designates any data file identifier in the set of output data file identifiers associated with the first event record as being part of valid data file set 612. For example, data file set determiner 605 may read the output data file identifier field of the first event record (as described above with reference to FIG. 3) to determine whether an output data file identifier is included in the set. If any such output data file identifiers are included therein, data file set determiner 605 designates such output data file identifiers as being part of valid data file set 612.

In accordance with one or more embodiments, in response to determining that the operation associated with the first event record was successful, any data file identifier in the set of input data file identifiers of the first event record, that is already included in the valid data file set, are re-designated as being part of the invalid data file set. For example, with reference to FIG. 6, data file set determiner 605 determines whether any data file identifier in the set of input data file identifiers of the first event record are already included in valid data file set 612. For example, data file set determiner 605 may read the input data file identifier field of the first event record (as described above with reference to FIG. 3) to determine the input data file identifiers associated with the operation and compare such input data file identifiers to the identifiers included in valid data file set 612. If such input data file identifiers are included in valid data file set 612, data file set determiner 605 re-designates such input data file identifiers as being part of invalid data file 614 (i.e., such input data file identifiers are moved from valid data file set 612 to invalid data file set 614).

At step 508, any data file identifier in the set of output data file identifiers associated with the first event record are designated as being part of an invalid data file set. For example, with reference to FIG. 6, data file set determiner 605 designates any data file identifier in the set of output data file identifiers associated with the first event record as being part of invalid data file set 614. For example, data file set determiner 605 may read the output data file identifier field of the first event record (as described above with reference to FIG. 3) and determine whether any output data file identifiers are specified therein. If such output data file identifiers are specified therein, data file set determiner 605 designates such output data file identifiers as being part of invalid data file set 614.

The following step 510 is performed for a second event record in the ordered sequence that follows the one or more first records in the ordered sequence. At step 510, a determination is made that a data inconsistency exists with respect to the table based on one or more of the valid data file set, the invalid data file set, and one or more of the set of input data file identifiers associated with the second event record and the set of output data file identifiers associated with the second event record. For example, with reference to FIG. 6, consistency checker 606 may obtain the second event record from even record obtainer 602. Consistency checker 606 determines that a data inconsistency exists with respect to the table based on valid data file set 612, invalid data file set 614, the set of input data file identifiers associated with the second event record, and/or the set of output data file identifiers associated with the second event record. Consistency checker 606 may determine the set of input data file identifiers and the set of output data file identifiers by reading the input data file identifier field and the output data input data file identifier field of the second event record. As will be described below with reference to FIG. 7, consistency checker 606 determines that a data inconsistency exits with respect to the table based on an application of a data consistency rule of data consistency rules 616.

Figure 7:
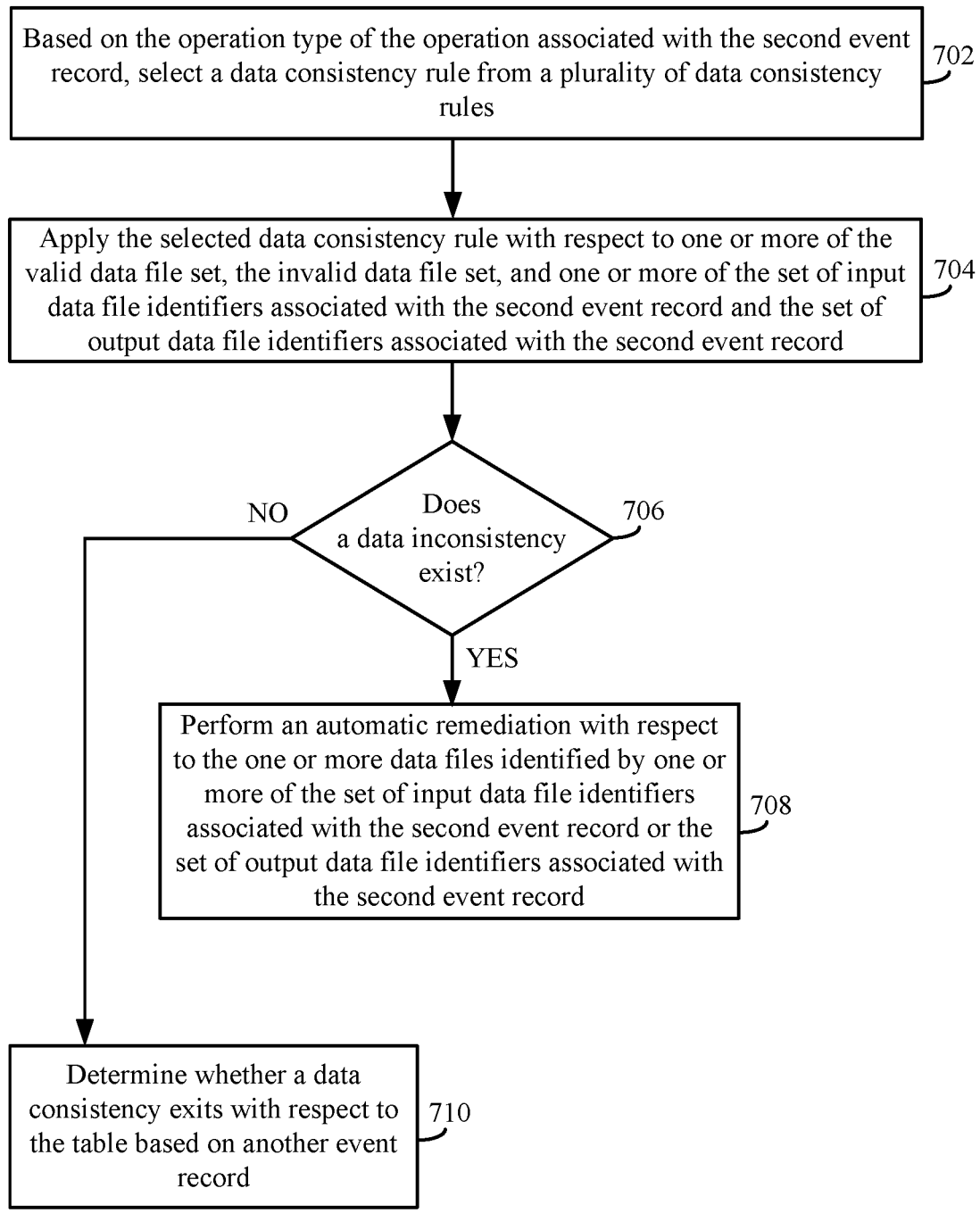
FIG. 7 shows a flowchart of a method for determining that a data inconsistency exists in accordance with an example embodiment.

FIG. 7 shows a flowchart 700 of a method for determining that a data inconsistency exists in accordance with an example embodiment. In an embodiment, flowchart 700 may be implemented by data consistency engine 630 shown in FIG. 6, although the method is not limited to that implementation. Accordingly, flowchart 700 will be described with reference to FIG. 6. Other structural and operational embodiments will be apparent to persons skilled in the relevant art(s) based on the discussion regarding flowchart 700 and system 600 of FIG. 6.

Flowchart 700 begins with step 702. At step 702, based on the operation type of the operation associated with the second event record, a data consistency rule is selected from a plurality of data consistency rules. For example, with reference to FIG. 6, consistency checker 606 may read the operation type field of the second event record (as described above with reference to FIG. 3) and determines the operation type. Consistency checker 606 selects a data consistency rule from data consistency rules 616 that is associated with the operation type.

At step 704, the selected data consistency rule is applied with respect to one or more of the valid data file set, the invalid data file set, and one or more of the set of input data file identifiers associated with the second event record and the set of output data file identifiers associated with the second event record. For example, with reference to FIG. 6, data consistency checker 606 applies the selected data consistency rule with respect to valid data file set 612, invalid data file set 614, the set of input data file identifiers associated with the second event record and/or the set of output data file identifiers associated with the second event record. Consistency checker 606 may read the input data file identifier field and the output data file identifier field of the second event record to determine the set of input data file identifiers and the set of output data file identifiers.

At step 706, based on the application of the selected data consistency rule, a determination is made as to whether a data inconsistency exists with respect to one or more data files identified by one or more of the set of input data file identifiers associated with the second event record or the set of output data file identifiers associated with the second event record. For example, with reference to FIG. 6, consistency checker 606 determines whether a data inconsistency exits with respect to one or more data files identified by one or more of the set of input data file identifiers associated with the second event record or the set of output data file identifiers associated with the second event record.

At step 708, in response to determining that a data inconsistency exists, an automatic remediation is performed with respect to the one or more data files identified by one or more of the set of input data file identifiers associated with the second event record or the set of output data file identifiers associated with the second event record. For example, with reference to FIG. 6, consistency checker 606 performs an automatic remediation with respect to the one or more data files identified by one or more of the set of input data file identifiers associated with the second event record or the set of output data file identifiers associated with the second event record.

In accordance with one or more embodiments, the automatic remediation comprises one of recovering the one or more data files, identified by one or more of the set of input data file identifiers associated with the second event record or the set of output data file identifiers associated with the second event record, from a backup of the table; or removing the one or more data files, identified by one or more of the set of input data file identifiers associated with the second event record or the set of output data file identifiers associated with the second event record at least one of the first data file or the second data file, from the table. For example, with reference to FIG. 6, consistency checker 606 may send a command to transaction manager 202 (as shown in FIG. 2) that causes transaction manager 202 to issue a command that recovers the one or more data files, identified by one or more of the set of input data file identifiers associated with the second event record or the set of output data file identifiers associated with the second event record, from a backup of the table, or removes the one or more data files, identified by one or more of the set of input data file identifiers associated with the second event record or the set of output data file identifiers associated with the second event record at least one of the first data file or the second data file, from the table.

At step 710, a determination is made as to whether a data consistency exists with respect to the table based on another event record. For example, with reference to FIG. 6, consistency checker 606 may perform steps 707, 704, and 706 with respect to another event record in the ordered sequence that follows the second event record.

Figure 8:
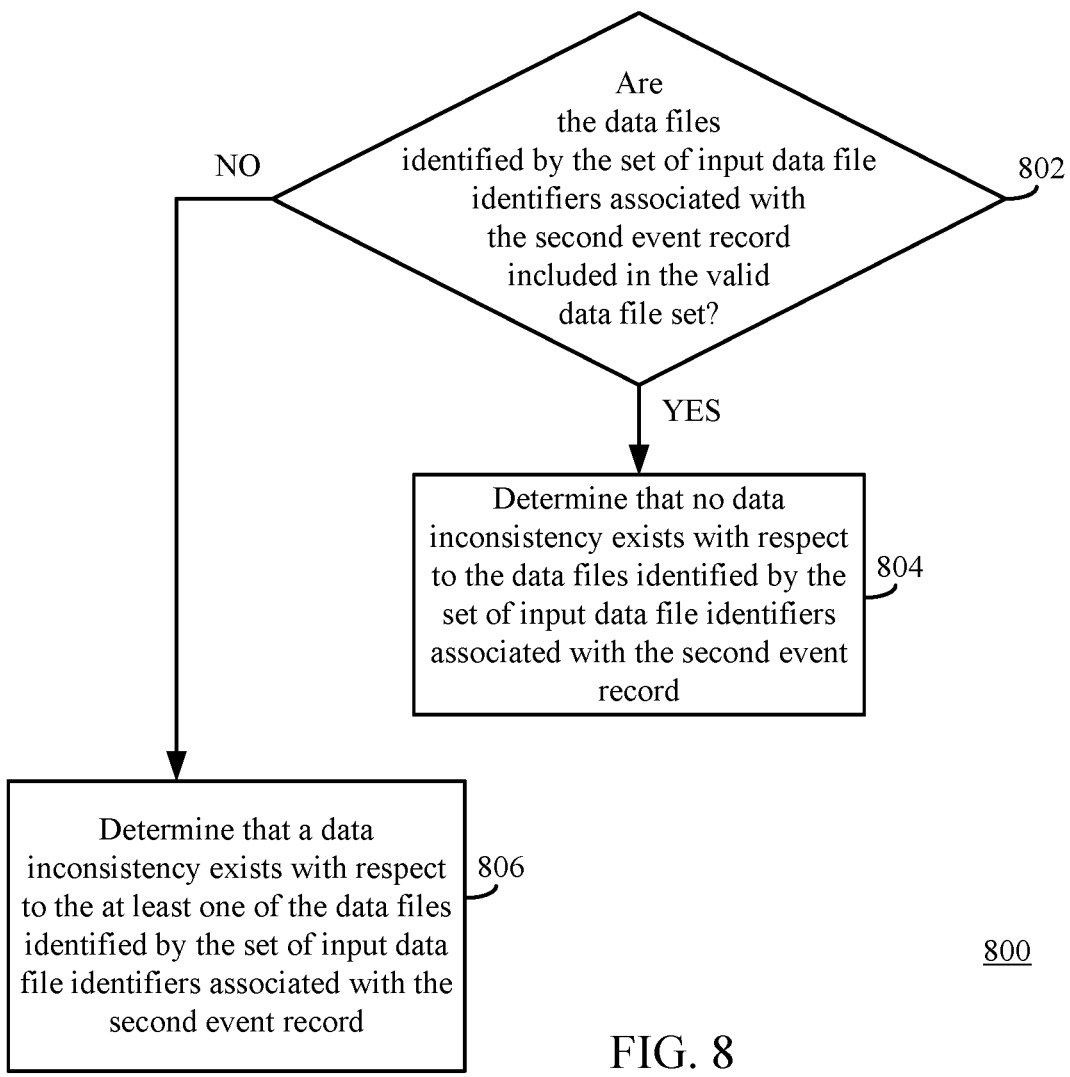
FIG. 8 shows a flowchart of a method for determining that a data consistency exists based on a merge or re-cluster operation in accordance with an example embodiment.

In accordance with one or more embodiments, the operation associated with the second event record is one of a merge operation configured to merge data files identified by the set of input data file identifiers associated with the second event record or a re-cluster operation configured to re-arrange data files identified by the set of input data file identifiers associated with the second event record. FIG. 8 shows a flowchart 800 of a method for determining that a data consistency exists based on a merge or re-cluster operation in accordance with an example embodiment. The method is performed in accordance with the data consistency rule selected as result of the operation being a merge operation. In an embodiment, flowchart 800 may be implemented by data consistency engine 630 shown in FIG. 6, although the method is not limited to that implementation. Accordingly, flowchart 800 will be described with reference to FIG. 6. Other structural and operational embodiments will be apparent to persons skilled in the relevant art(s) based on the discussion regarding flowchart 800 and system 600 of FIG. 6.

Flowchart 800 begins with step 802. At step 802, a determination is made as to whether the data files identified by the set of input data file identifiers associated with the second event record are included the valid data file set. If a determination is made that the data files identified by the set of input data file identifiers associated with the second event record are included in the valid data file set, flow continues to step 804. Otherwise (e.g., if the data files identified by the set of input data file identifiers are not included in the valid data file set or included in the invalid data file set), flow continues to step 806. For example, with reference to FIG. 6, consistency checker 606 may read the input data file identifier field of the second event record to determine the input data file identifiers for the data files. Consistency checker 606 may compare the determined input data file identifiers to the input data file identifiers included in valid data file set 612 to determine whether the data files identified by the set of input data file identifiers associated with the second event record are included valid data file set 612.

At step 804, a determination is made that no data inconsistency exists with respect to the data files identified by the set of input data file identifiers. For example, with reference to FIG. 6, consistency checker 606 determines that no data inconsistency exists with respect to the data files identified by the set of input data file identifiers.

At step 806, a determination is made that a data inconsistency exists with respect to the at least one of the data files identified by the set of input data file identifiers. For example, with reference to FIG. 6, consistency checker 606 determines that a data inconsistency exists with respect to the at least one of the data files identified by the set of input data file identifiers.

Figure 9:
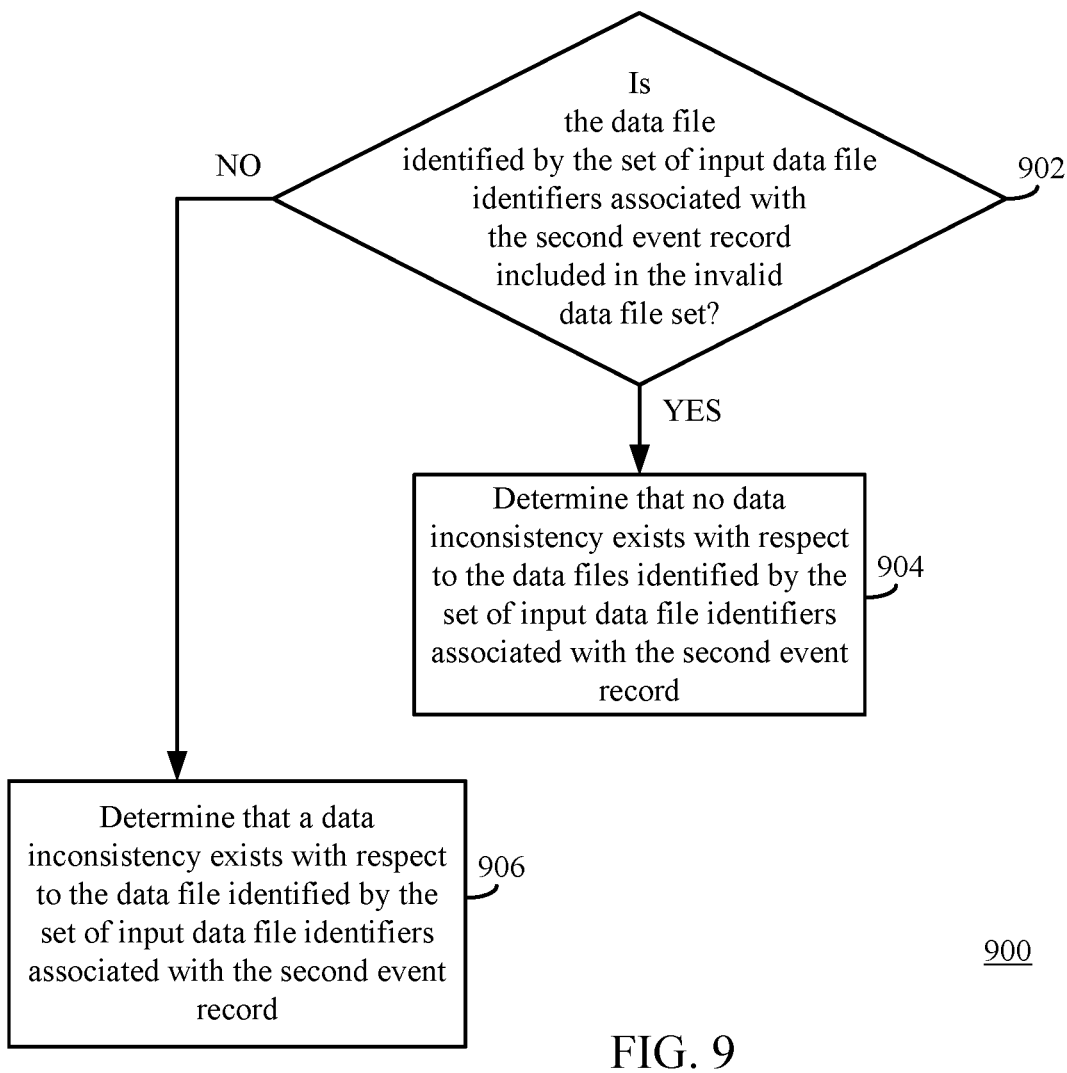
FIG. 9 shows a flowchart of a method for determining that a data consistency exists based on a garbage collection operation in accordance with an example embodiment.

In accordance with one or more embodiments, the operation associated with the second event record is a garbage collection operation configured to remove a data file, identified by the set of input data file identifiers associated with the second event record, from the table. FIG. 9 shows a flowchart 900 of a method for determining that a data consistency exists based on a garbage collection operation in accordance with an example embodiment. The method is performed in accordance with the data consistency rule selected as result of the operation being a garbage collection operation. In an embodiment, flowchart 900 may be implemented by data consistency engine 630 shown in FIG. 6, although the method is not limited to that implementation. Accordingly, flowchart 900 will be described with reference to FIG. 6. Other structural and operational embodiments will be apparent to persons skilled in the relevant art(s) based on the discussion regarding flowchart 900 and system 600 of FIG. 6.

Flowchart 900 begins with step 902. At step 902, a determination is made as to whether the data file identified by the set of input data file identifiers associated with the second event record are included the invalid data file set. If a determination is made that the data file identified by the set of input data file identifiers associated with the second event record are included in the invalid data file set, flow continues to step 904. Otherwise (e.g., if the data file identified by the set of input data file identifiers is not included in the invalid data file set or included in the valid data file set), flow continues to step 906. For example, with reference to FIG. 6, consistency checker 606 may read the input data file identifier field of the second event record to determine the input data file identifier for the data file. Consistency checker 606 may compare the determined input data file identifier to the input data file identifiers included in invalid data file set 614 to determine whether the data file identified by the set of input data file identifiers associated with the second event record is included invalid data file set 614.

At step 904, a determination is made that no data inconsistency exists with respect to the data files identified by the set of input data file identifiers. For example, with reference to FIG. 6, consistency checker 606 determines that no data inconsistency exists with respect to the data files identified by the set of input data file identifiers.

At step 906, a determination is made that a data inconsistency exists with respect to the data file identified by the set of input data file identifiers associated with the second event record. For example, with reference to FIG. 6, consistency checker 606 determines that a data inconsistency exists with respect to the data file identified by the set of input data file identifiers associated with the second event record.

Figure 10:
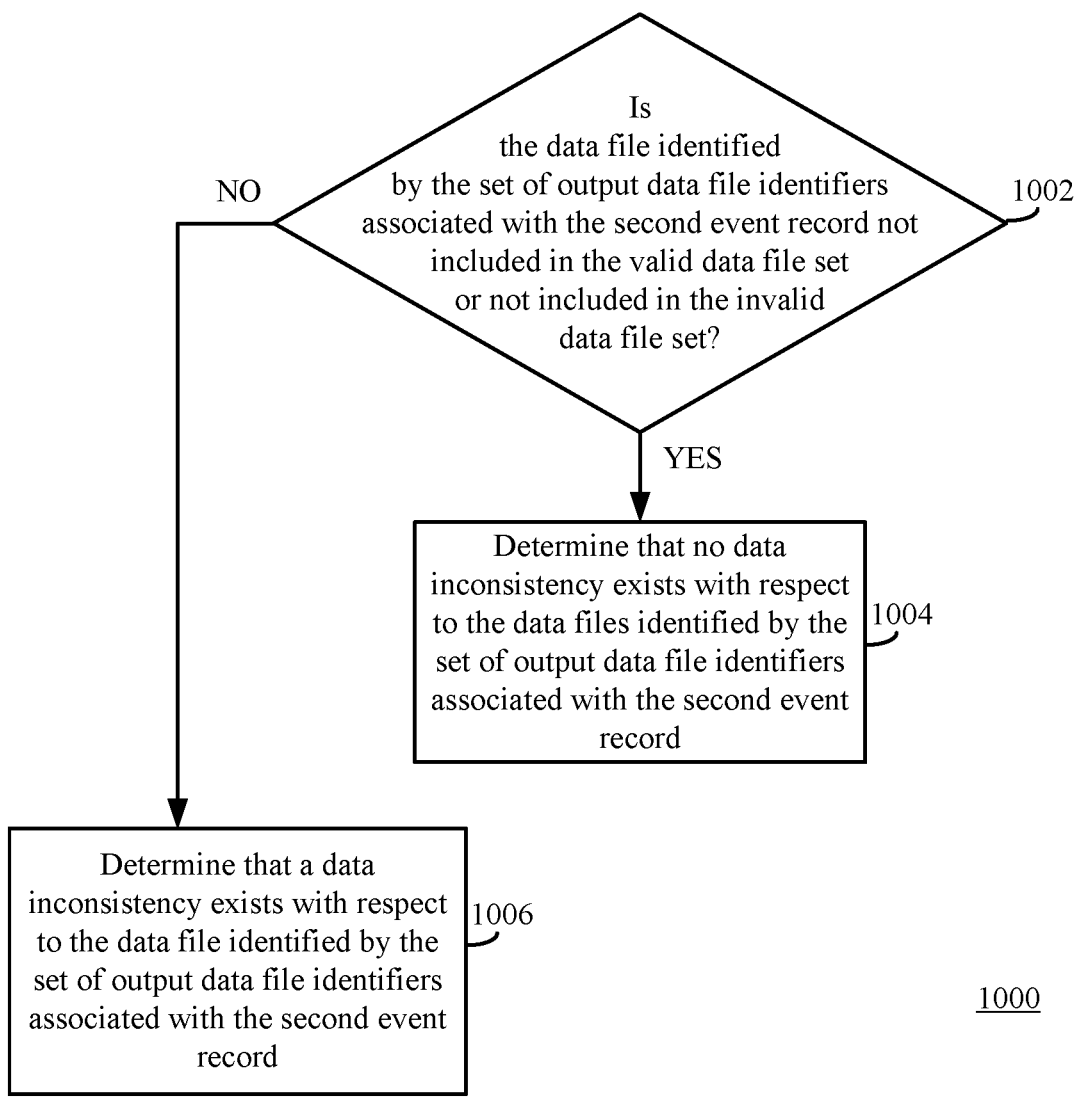
FIG. 10 shows a flowchart of a method for determining that a data consistency exists based on a load operation in accordance with an example embodiment.

In accordance with one or more embodiments, the operation associated with the second event record is a load operation configured to load a data file, identified by the set of output data file identifiers associated with the second event record, from the table. FIG. 10 shows a flowchart 1000 of a method for determining that a data consistency exists based on a load operation in accordance with an example embodiment. The method is performed in accordance with the data consistency rule selected as result of the operation being a load operation. In an embodiment, flowchart 1000 may be implemented by data consistency engine 630 shown in FIG. 6, although the method is not limited to that implementation. Accordingly, flowchart 1000 will be described with reference to FIG. 6. Other structural and operational embodiments will be apparent to persons skilled in the relevant art(s) based on the discussion regarding flowchart 1000 and system 600 of FIG. 6.

Flowchart 1000 begins with step 1002. At step 1002, a determination is made as to whether the data file identified by the set of output data file identifiers associated with the second event record is not included the valid data file set and not included in the invalid data file set. If a determination is made that the data file identified by the set of output data file identifiers associated with the second event record is not included in the valid data file set and not included in the invalid data file set, flow continues to step 1004. Otherwise (e.g., if the data file identified by the set of output data file identifiers is included in at least one of the valid data file set or the invalid data file set), flow continues to step 1006. For example, with reference to FIG. 6, consistency checker 606 may read the output data file identifier field of the second event record to determine the output data file identifier for the data file. Consistency checker 606 may compare the determined output data file identifier to the output data file identifiers included in valid data file set 612 (if any) and invalid data file set 614 (if any) to determine whether the data file identified by the set of output data file identifiers associated with the second event record is not included valid data file set 612 and invalid data file set 614.

At step 1004, a determination is made that no data inconsistency exists with respect to the data file identified by the set of output data file identifiers. For example, with reference to FIG. 6, consistency checker 606 determines that no data inconsistency exists with respect to the data files identified by the set of output data file identifiers.

At step 1006, a determination is made that a data inconsistency exists with respect to the data file identified by the set of output data file identifiers associated with the second event record. For example, with reference to FIG. 6, consistency checker 606 determines that a data inconsistency exists with respect to the data file identified by the set of output data file identifiers associated with the second event record.

Figure 11:
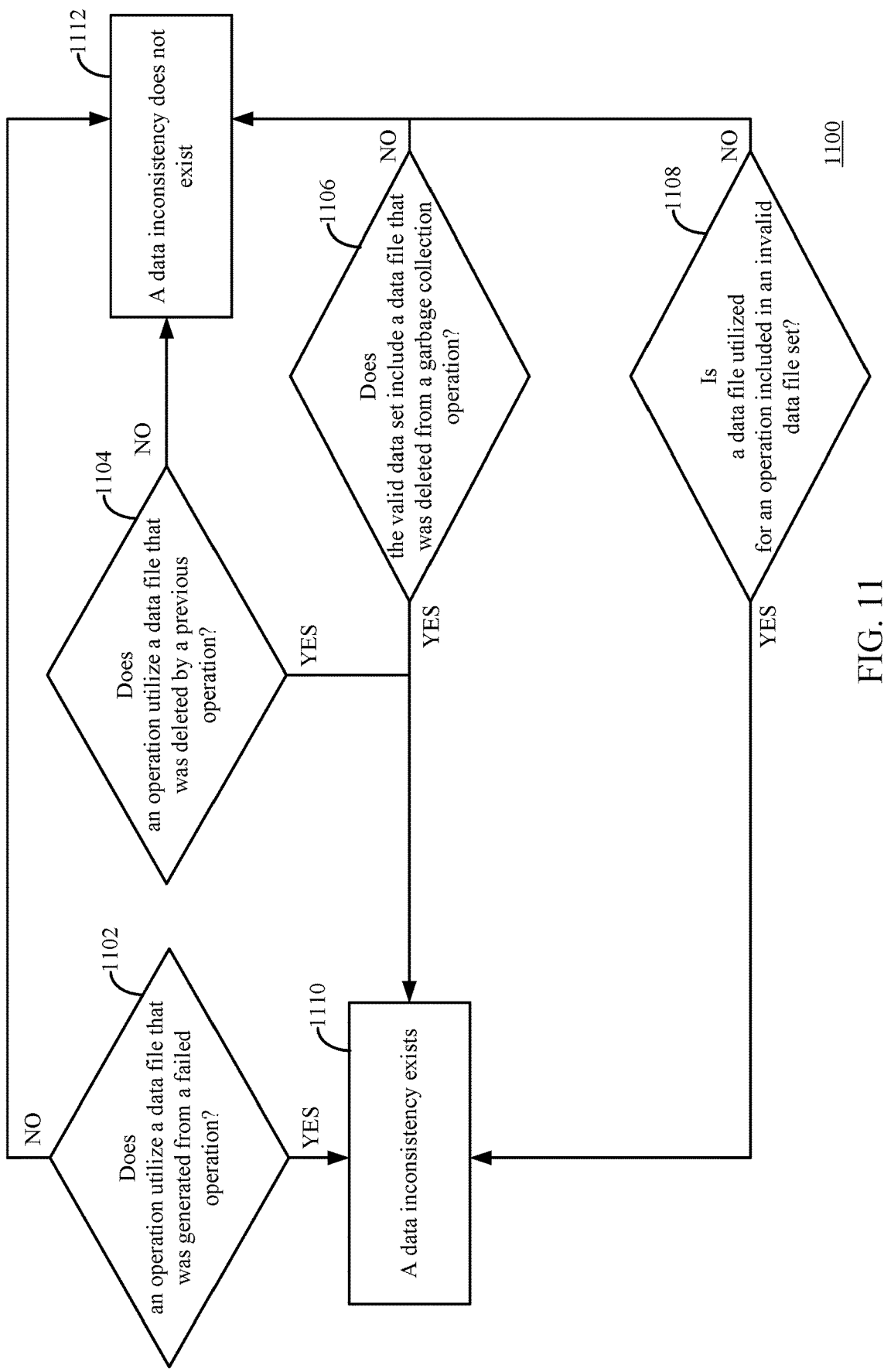
FIG. 11 shows a flowchart of a method for determining that a data consistency utilizing various weak data inconsistency rules in accordance with an example embodiment.

In accordance with one or more embodiments, consistency checker 606 may utilize weak data inconsistency rules to determine whether a data consistency exists, for example, in situations in which, data store 604 has a finite retention period or there is a possibility of missing events due to failures. FIG. 11 shows a flowchart 1100 of a method for determining that a data consistency utilizing various weak data inconsistency rules in accordance with an example embodiment. In an embodiment, flowchart 1100 may be implemented by data consistency engine 630 shown in FIG. 6, although the method is not limited to that implementation. Accordingly, flowchart 1100 will be described with reference to FIG. 6. Other structural and operational embodiments will be apparent to persons skilled in the relevant art(s) based on the discussion regarding flowchart 1100 and system 600 of FIG. 6.

Flowchart 1100 begins with step 1102. At step 1102, a determination is made as to whether an operation utilizes a data file that was generated from a failed operation. In the event that it is determined that an operation utilizes a data file that was generated from a failed operation, flow continues to step 1110. Otherwise, flow continues with step 1112. For example, with reference to FIG. 6, consistency checker 606 may utilize a weak data inconsistency rule of data consistency rules 616 that determines whether an operation utilizes a data file that was generated from a failed operation based on an analysis of event records received from event record obtainer 602 and valid data file set 612 and/or invalid data file set 614.

At step 1104, a determination is made as to whether an operation utilizes a data file that was deleted by a previous operation. In the event that it is determined that an operation utilizes a data file that was deleted by a previous operation, flow continues to step 1110. Otherwise, flow continues with step 1112. For example, with reference to FIG. 6, consistency checker 606 may utilize a weak data inconsistency rule of data consistency rules 616 that determines whether an operation utilizes a data file that was deleted by a previous operation based on an analysis of event records received from event record obtainer 602 and valid data file set 612 and/or invalid data file set 614.

At step 1106, a determination is made as to whether the valid data set includes a data file that was deleted from a garbage collection operation. In the event that it is determined that the valid data set includes a data file that was deleted from a garbage collection operation, flow continues to step 1110. Otherwise, flow continues with step 1112. For example, with reference to FIG. 6, consistency checker 606 may utilize a weak data inconsistency rule of data consistency rules 616 that determines whether valid data file set 612 includes a data file that was deleted from a garbage collection operation.

At step 1108, a determination is made as to whether a data file utilized for an operation is included in an invalid data file set. In the event that it is determined that a data file that was utilized for an operation is included in an invalid data file set, flow continues to step 1110. Otherwise, flow continues with step 1112. For example, with reference to FIG. 6, consistency checker 606 may utilize a weak data inconsistency rule of data consistency rules 616 that determines whether a data file that was utilize for an operation is included in invalid data file set 614 based on analysis of event records received from event record obtainer 602 and invalid data file set 614.

At step 1110, a determination is made that a data inconsistency exists. For example, with reference to FIG. 6, consistency checker 606 determines that a data inconsistency exists.

At step 1112, a determination is made that a data inconsistency does not exist. For example, with reference to FIG. 6, consistency checker 606 determines that a data inconsistency does not exist.

III. Example Computer System Implementation

The systems and methods described above in reference to FIGS. 1-11, may be implemented in hardware, or hardware combined with one or both of software and/or firmware. For example, system 1200 may be used to implement any of nodes 108A-10NB, 112A-112N, and/or 114A-114N, storage node(s) 110A-110N, database server application 118, and data consistency engine 130 of FIG. 1, database application 218, transaction manager 202, data store 204, nodes 206, 208, 210, and data consistency engine 230 of FIG. 2, data consistency engine 630, data store 604, event record obtainer 602, data file set determiner 605, consistency checker 606, and data consistency rules 616 of FIG. 6, and/or any of the components respectively described therein, and/or each of the components described therein, and flowcharts 500, 700, 800, 900 and/or 1000 may be each implemented as computer program code/instructions configured to be executed in one or more processors and stored in a computer readable storage medium. Alternatively, any of nodes 108A-10NB, 112A-112N, and/or 114A-114N, storage node(s) 110A-110N, database server application 118, and data consistency engine 130 of FIG. 1, database application 218, transaction manager 202, data store 204, nodes 206, 208, 210, and data consistency engine 230 of FIG. 2, data consistency engine 630, data store 604, event record obtainer 602, data file set determiner 605, consistency checker 606, and data consistency rules 616 of FIG. 6, and/or any of the components respectively described therein, and/or each of the components described therein, and flowcharts 500, 700, 800, 900 and/or 1000 may be implemented as hardware logic/electrical circuitry. In an embodiment, any of nodes 108A-10NB, 112A-112N, and/or 114A-114N, storage node(s) 110A-110N, database server application 118, and data consistency engine 130 of FIG. 1, database application 218, transaction manager 202, data store 204, nodes 206, 208, 210, and data consistency engine 230 of FIG. 2, data consistency engine 630, data store 604, event record obtainer 602, data file set determiner 605, consistency checker 606, and data consistency rules 616 of FIG. 6, and/or any of the components respectively described therein, and/or each of the components described therein, and flowcharts 500, 700, 800, 900 and/or 1000 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 12:
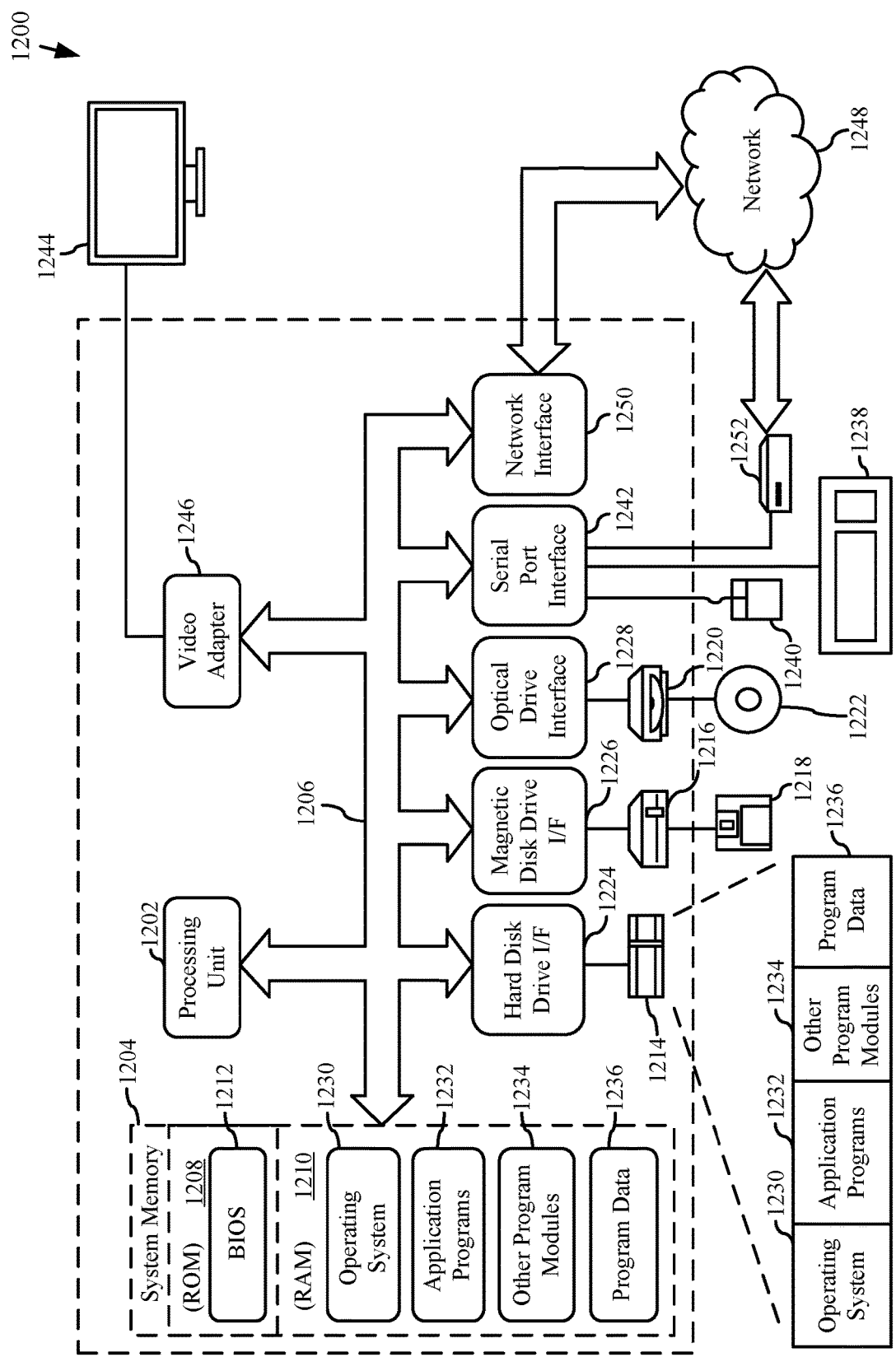
FIG. 12 is a block diagram of an example processor-based computer system that may be used to implement various embodiments.

FIG. 12 depicts an exemplary implementation of a computing device 1200 in which embodiments may be implemented, including any of nodes 108A-10NB, 112A-112N, and/or 114A-114N, storage node(s) 110A-110N, database server application 118, and data consistency engine 130 of FIG. 1, database application 218, transaction manager 202, data store 204, nodes 206, 208, 210, and data consistency engine 230 of FIG. 2, data consistency engine 630, data store 604, event record obtainer 602, data file set determiner 605, consistency checker 606, and data consistency rules 616 of FIG. 6, and/or any of the components respectively described therein, and/or each of the components described therein, and flowcharts 500, 700, 800, 900 and/or 1000. The description of computing device 1200 provided herein is provided for purposes of illustration, and is not intended to be limiting. Embodiments may be implemented in further types of computer systems, as would be known to persons skilled in the relevant art(s).

As shown in FIG. 12, computing device 1200 includes one or more processors, referred to as processor circuit 1202, a system memory 1204, and a bus 1206 that couples various system components including system memory 1204 to processor circuit 1202. Processor circuit 1202 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1202 may execute program code stored in a computer readable medium, such as program code of operating system 1230, application programs 1232, other programs 1234, etc. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computing device 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1230, one or more application programs 1232, other programs 1234, and program data 1236. Application programs 1232 or other programs 1234 may include, for example, computer program logic (e.g., computer program code or instructions) for implementing the systems described above, including the embodiments described above with reference to FIGS. 1-11.

A user may enter commands and information into the computing device 1200 through input devices such as keyboard 1238 and pointing device 1240. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1202 through a serial port interface 1242 that is coupled to bus 1206, but may be connected by other interfaces, such as a parallel port, game port, or a universal serial bus (USB).

A display screen 1244 is also connected to bus 1206 via an interface, such as a video adapter 1246. Display screen 1244 may be external to, or incorporated in computing device 1200. Display screen 1244 may display information, as well as being a user interface for receiving user commands and/or other information (e.g., by touch, finger gestures, a virtual keyboard, by providing a tap input (where a user lightly presses and quickly releases display screen 1244), by providing a "touch-and-hold" input (where a user touches and holds his finger (or touch instrument) on display screen 1244 for a predetermined period of time), by providing touch input that exceeds a predetermined pressure threshold, etc.). In addition to display screen 1244, computing device 1200 may include other peripheral output devices (not shown) such as speakers and printers.

Computing device 1200 is connected to a network 1248 (e.g., the Internet) through an adaptor or network interface 1250, a modem 1252, or other means for establishing communications over the network. Modem 1252, which may be internal or external, may be connected to bus 1206 via serial port interface 1242, as shown in FIG. 12, or may be connected to bus 1206 using another interface type, including a parallel interface.

As used herein, the terms "computer program medium," "computer-readable medium," and "computer-readable storage medium" are used to generally refer to physical hardware media such as the hard disk associated with hard disk drive 1214, removable magnetic disk 1218, removable optical disk 1222, other physical hardware media such as RAMs, ROMs, flash memory cards, digital video disks, zip disks, MEMs, nanotechnology-based storage devices, and further types of physical/tangible hardware storage media (including system memory 1204 of FIG. 12). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1232 and other programs 1234) may be stored on the hard disk, magnetic disk, optical disk, ROM, RAM, or other hardware storage medium. Such computer programs may also be received via network interface 1250, serial port interface 1252, or any other interface type. Such computer programs, when executed or loaded by an application, enable computing device 1200 to implement features of embodiments discussed herein. Accordingly, such computer programs represent controllers of the computing device 1200.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A computer-implemented method for consistency checking of data files in a distributed database system that represent a table is described herein. The method includes: obtaining an ordered sequence of event records associated with the table, each event record in the ordered sequence including information about a particular operation performed with respect to one or more of the data files, the information for the particular operation including a transaction version, an operation type, a set of input data file identifiers, a set of output data file identifiers, and an operation status; performing the following for each of one or more first event records in the ordered sequence, in the order specified by the ordered sequence: determining whether the operation associated with the first event record was successful or unsuccessful based on the operation status associated with the first event record; in response to determining that the operation associated with the first event record was successful, designating any data file identifier in the set of output data file identifiers associated with the first event record as being part of a valid data file set; and in response to determining that the operation associated with the first event record was unsuccessful, designating any data file identifier in the set of output data file identifiers associated with the first event record as being part of an invalid data file set; and performing the following for a second event record in the ordered sequence that follows the one or more first records in the ordered sequence: determining that a data inconsistency exists with respect to the table based on one or more of the valid data file set, the invalid data file set, and one or more of the set of input data file identifiers associated with the second event record and the set of output data file identifiers associated with the second event record.

In one implementation of the foregoing method, in response to determining that the operation associated with the first event record was successful, also performing: re-designating any data file identifier in the set of input data file identifiers of the first event record, that is already included in the valid data file set, as being part of the invalid data file set.

In one implementation of the foregoing method, obtaining the ordered sequence of event records comprises: obtaining the event records as an unordered sequence; and organizing the event records in the ordered sequence based on the transaction versions associated therewith.

In one implementation of the foregoing method, determining that a data inconsistency exists comprises: based on the operation type of the operation associated with the second event record, selecting a data consistency rule from a plurality of data consistency rules; applying the selected data consistency rule with respect to one or more of the valid data file set, the invalid data file set, and one or more of the set of input data file identifiers associated with the second event record and the set of output data file identifiers associated with the second event record; based on the application of the selected data consistency rule, determining whether a data inconsistency exists with respect to one or more data files identified by one or more of the set of input data file identifiers associated with the second event record or the set of output data file identifiers associated with the second event record; and in response to determining that a data inconsistency exists, performing an automatic remediation with respect to the one or more data files identified by one or more of the set of input data file identifiers associated with the second event record or the set of output data file identifiers associated with the second event record.

In one implementation of the foregoing method, performing the automatic remediation comprises one of: recovering the one or more data files, identified by one or more of the set of input data file identifiers associated with the second event record or the set of output data file identifiers associated with the second event record, from a backup of the table; or removing the one or more data files, identified by one or more of the set of input data file identifiers associated with the second event record or the set of output data file identifiers associated with the second event record at least one of the first data file or the second data file, from the table.

In one implementation of the foregoing method, the operation associated with the second event record is one of a merge operation configured to merge data files identified by the set of input data file identifiers associated with the second event record or a re-cluster operation configured to re-arrange data files identified by the set of input data file identifiers associated with the second event record, and applying the selected data consistency rule comprises: determining whether the data files identified by the set of input data file identifiers associated with the second event record are included the valid data file set; in response to a determination that the data files identified by the set of input data file identifiers are included in the valid data file set, determining that no data inconsistency exists with respect to the data files identified by the set of input data file identifiers associated with the second event record; and in response a determination that at least one of the data files identified by the set of input data file identifiers are not included in the valid data file set, determining that a data inconsistency exists with respect to the at least one of the data files identified by the set of input data file identifiers associated with the second event record.

In one implementation of the foregoing method, the operation associated with the second event record is a garbage collection operation configured to remove a data file, identified by the set of input data file identifiers associated with the second event record, from the table, and applying the selected data consistency rule comprises: determining whether the data file identified by the set of input data file identifiers associated with the second event record is included in the invalid data file set; in response to a determination that the data file identified by the set of input data file identifiers associated with the second event record is included in the invalid data file set, determining that no data inconsistency exists with respect to the data file identified by the set of input data file identifiers associated with the second event record; and in response to a determination that the data file identified by the set of input data file identifiers associated with the second event record is not included in the invalid data file set, determining that a data inconsistency exists with respect to the data file identified by the set of input data file identifiers associated with the second event record.

In one implementation of the foregoing method, the operation associated with the second event record is a load operation configured to load a data file, identified by the set of output data file identifiers associated with the second event record, from the table, and applying the selected data consistency rule comprises: determining whether the data file identified by the set of output data file identifiers associated with the second event record is not included in the valid data file and not included in the invalid data file set; in response to a determination that the data file identified by the set of output data file identifiers associated with the second event record is not included in the valid data file set and not included in the invalid data file set, determining that no data inconsistency exists with respect to the data file identified by the set of output data file identifiers associated with the second event record; and in response to a determination that the data file identified by the set of output data file identifiers associated with the second event record is included in at least one of the valid data file set or the invalid data file set, determining that a data inconsistency exists with respect to the data file identified by the set of output data file identifiers associated with the second event record.

A system in accordance with any of the embodiments described herein is also disclosed. The system includes: at least one processor circuit; and at least one memory that stores program code configured to be executed by the at least one processor circuit, the program code comprising: an event record obtainer configured to obtain an ordered sequence of event records associated with the table, each event record in the ordered sequence including information about a particular operation performed with respect to one or more of the data files, the information for the particular operation including a transaction version, an operation type, a set of input data file identifiers, a set of output data file identifiers, and an operation status; a data file set determiner configured to perform the following for each of one or more first event records in the ordered sequence, in the order specified by the ordered sequence: determine whether the operation associated with the first event record was successful or unsuccessful based on the operation status associated with the first event record; in response to determining that the operation associated with the first event record was successful, designate any data file identifier in the set of output data file identifiers associated with the first event record as being part of a valid data file set; and in response to determining that the operation associated with the first event record was unsuccessful, designate any data file identifier in the set of output data file identifiers associated with the first event record as being part of an invalid data file set; and a consistency checker configured to perform the following for a second event record in the ordered sequence that follows the one or more first records in the ordered sequence: determine that a data inconsistency exists with respect to the table based on one or more of the valid data file set, the invalid data file set, and one or more of the set of input data file identifiers associated with the second event record and the set of output data file identifiers associated with the second event record.

In one implementation of the foregoing system, in response to determining that the operation associated with the first event record was successful, the data file set determiner is further configured to: re-designate any data file identifier in the set of input data file identifiers of the first event record, that is already included in the valid data file set, as being part of the invalid data file set.

In one implementation of the foregoing system, the event record obtainer is further configured to: obtain the event records as an unordered sequence; and organize the event records in the ordered sequence based on the transaction versions associated therewith.

In one implementation of the foregoing system, the consistency checker is further configured to: based on the operation type of the operation associated with the second event record, select a data consistency rule from a plurality of data consistency rules; apply the selected data consistency rule with respect to one or more of the valid data file set, the invalid data file set, and one or more of the set of input data file identifiers associated with the second event record and the set of output data file identifiers associated with the second event record; based on the application of the selected data consistency rule, determine whether a data inconsistency exists with respect to one or more data files identified by one or more of the set of input data file identifiers associated with the second event record or the set of output data file identifiers associated with the second event record; and in response to determining that a data inconsistency exists, perform an automatic remediation with respect to the one or more data files identified by one or more of the set of input data file identifiers associated with the second event record or the set of output data file identifiers associated with the second event record.

In one implementation of the foregoing system, the consistency checker is configured perform the automatic remediation by performing one of: cause the one or more data files, identified by one or more of the set of input data file identifiers associated with the second event record or the set of output data file identifiers associated with the second event record, to be recovered from a backup of the table; or cause the one or more data files, identified by one or more of the set of input data file identifiers associated with the second event record or the set of output data file identifiers associated with the second event record at least one of the first data file or the second data file, to be removed from the table.

In one implementation of the foregoing system, the operation associated with the second event record is one of a merge operation configured to merge data files identified by the set of input data file identifiers associated with the second event record or a re-cluster operation configured to re-arrange data files identified by the set of input data file identifiers associated with the second event record, and the consistency checker, in accordance with the selected data consistency rule, performs the following: determine whether the data files identified by the set of input data file identifiers associated with the second event record are included the valid data file set; in response to a determination that the data files identified by the set of input data file identifiers are included in the valid data file set, determine that no data inconsistency exists with respect to the data files identified by the set of input data file identifiers associated with the second event record; and in response a determination that at least one of the data files identified by the set of input data file identifiers are not included in the valid data file set, determine that a data inconsistency exists with respect to the at least one of the data files identified by the set of input data file identifiers associated with the second event record.

In one implementation of the foregoing system, the operation associated with the second event record is a garbage collection operation configured to remove a data file, identified by the set of input data file identifiers associated with the second event record, from the table, and the consistency checker, in accordance with the selected data consistency rule, performs the following: determine whether the data file identified by the set of input data file identifiers associated with the second event record is included in the invalid data file set; in response to a determination that the data file identified by the set of input data file identifiers associated with the second event record is included in the invalid data file set, determine that no data inconsistency exists with respect to the data file identified by the set of input data file identifiers associated with the second event record; and in response to a determination that the data file identified by the set of input data file identifiers associated with the second event record is not included in the invalid data file set, determine that a data inconsistency exists with respect to the data file identified by the set of input data file identifiers associated with the second event record.

In one implementation of the foregoing system, the operation associated with the second event record is a load operation configured to load a data file, identified by the set of output data file identifiers associated with the second event record, from the table, and the consistency checker, in accordance with the selected data consistency rule, performs the following: determine whether the data file identified by the set of output data file identifiers associated with the second event record is not included in the valid data file and not included in the invalid data file set; in response to a determination that the data file identified by the set of output data file identifiers associated with the second event record is not included in the valid data file set and not included in the invalid data file set, determine that no data inconsistency exists with respect to the data file identified by the set of output data file identifiers associated with the second event record; and in response to a determination that the data file identified by the set of output data file identifiers associated with the second event record is included in at least one of the valid data file set or the invalid data file set, determine that a data inconsistency exists with respect to the data file identified by the set of output data file identifiers associated with the second event record.

A computer-readable storage medium having program instructions recorded thereon that, when executed by at least one processor, perform a method for consistency checking of data files that represent a table. The method includes: obtaining an ordered sequence of event records associated with the table, each event record in the ordered sequence including information about a particular operation performed with respect to one or more of the data files, the information for the particular operation including a transaction version, an operation type, a set of input data file identifiers, a set of output data file identifiers, and an operation status; performing the following for each of one or more first event records in the ordered sequence, in the order specified by the ordered sequence: determining whether the operation associated with the first event record was successful or unsuccessful based on the operation status associated with the first event record; in response to determining that the operation associated with the first event record was successful, designating any data file identifier in the set of output data file identifiers associated with the first event record as being part of a valid data file set; and in response to determining that the operation associated with the first event record was unsuccessful, designating any data file identifier in the set of output data file identifiers associated with the first event record as being part of an invalid data file set; and performing the following for a second event record in the ordered sequence that follows the one or more first records in the ordered sequence: determining that a data inconsistency exists with respect to the table based on one or more of the valid data file set, the invalid data file set, and one or more of the set of input data file identifiers associated with the second event record and the set of output data file identifiers associated with the second event record.

In one implementation of the foregoing computer-readable storage medium, the method further comprising, in response to determining that the operation associated with the first event record was successful, re-designating any data file identifier in the set of input data file identifiers of the first event record, that is already included in the valid data file set, as being part of the invalid data file set.

In one implementation of the foregoing computer-readable storage medium, obtaining the ordered sequence of event records comprises: obtaining the event records as an unordered sequence; and organizing the event records in the ordered sequence based on the transaction versions associated therewith.

In one implementation of the foregoing computer-readable storage medium, determining that a data inconsistency exists comprises: based on the operation type of the operation associated with the second event record, selecting a data consistency rule from a plurality of data consistency rules: applying the selected data consistency rule with respect to one or more of the valid data file set, the invalid data file set, and one or more of the set of input data file identifiers associated with the second event record and the set of output data file identifiers associated with the second event record; based on the application of the selected data consistency rule, determining whether a data inconsistency exists with respect to one or more data files identified by one or more of the set of input data file identifiers associated with the second event record or the set of output data file identifiers associated with the second event record; and in response to determining that a data inconsistency exists, performing an automatic remediation with respect to the one or more data files identified by one or more of the set of input data file identifiers associated with the second event record or the set of output data file identifiers associated with the second event record.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A computer-implemented method for consistency checking of data files, in a distributed database system, that represent a table, comprising:
receiving an ordered sequence of event records associated with the table, each event record in the ordered sequence including information about a particular operation performed with respect to one or more of the data files, the information for the particular operation including a transaction version, an operation type identifying a type of operation represented by the event record, a set of input data file identifiers identifying data files acted on by the particular operation, a set of output data file identifiers identifying data files generated by the particular operation, and an operation status indicating whether the particular operation was committed;
processing each first event record in a plurality of first event records in the ordered sequence, in an order specified by the ordered sequence, by:

maintaining, in a valid data file set, data file identifiers corresponding to data files that should be visible until the currently processed first event;

maintaining, in an invalid data file set, data file identifiers corresponding to data files that should not be visible;

determining whether the operation associated with the first event record was successfully committed based on the operation status associated with the first event record;

in response to determining that the operation associated with the first event record was successfully committed, adding any data file identifier in the set of output data file identifiers associated with the first event record to the valid data file set; and in response to determining that the operation associated with the first event record was not successfully committed, adding any data file identifier in the set of output data file identifiers associated with the first event record to the invalid data file set; and performing the following for a second event record in the ordered sequence that follows at least one of the first event records in the ordered sequence:

determining that a data inconsistency exists with respect to the table based on at least one of the valid data file set or the invalid data file set, and at least one of the set of input data file identifiers associated with the second event record or the set of output data file identifiers associated with the second event record.

2. The computer-implemented method of claim 1, wherein, in response to determining that the operation associated with the first event record was successfully committed, also performing:

moving any data file identifier in the set of input data file identifiers of the first event record from the valid data file set to the invalid data file set.

3. The computer-implemented method of claim 1, wherein obtaining the ordered sequence of event records comprises:

obtaining the event records as an unordered sequence; and organizing the event records in the ordered sequence based on the transaction versions associated therewith.

4. The computer-implemented method of claim 1, wherein determining that a data inconsistency exists comprises:

based on the operation type of the operation associated with the second event record, selecting a data consistency rule from a plurality of data consistency rules;

applying the selected data consistency rule with respect to one or more of the valid data file set, the invalid data file set, and one or more of the set of input data file identifiers associated with the second event record and the set of output data file identifiers associated with the second event record;

based on the application of the selected data consistency rule, determining whether a data inconsistency exists with respect to one or more data files identified by one or more of the set of input data file identifiers associated with the second event record or the set of output data file identifiers associated with the second event record; and in response to determining that a data inconsistency exists, performing an automatic remediation with respect to the one or more data files identified by one or more of the set of input data file identifiers associated with the second event record or the set of output data file identifiers associated with the second event record.

5. The computer-implemented method of claim 4, wherein performing the automatic remediation comprises one of:

recovering the one or more data files, identified by one or more of the set of input data file identifiers associated with the second event record or the set of output data file identifiers associated with the second event record, from a backup of the table; or removing the one or more data files, identified by one or more of the set of input data file identifiers associated with the second event record or the set of output data file identifiers associated with the second event record at least one of the first data file or the second data file, from the table.

6. The computer-implemented method of claim 4, wherein the operation associated with the second event record is one of a merge operation configured to merge data files identified by the set of input data file identifiers associated with the second event record or a re-cluster operation configured to re-arrange data files identified by the set of input data file identifiers associated with the second event record, and wherein applying the selected data consistency rule comprises:

determining whether the data files identified by the set of input data file identifiers associated with the second event record are included the valid data file set;

in response to a determination that the data files identified by the set of input data file identifiers are included in the valid data file set, determining that no data inconsistency exists with respect to the data files identified by the set of input data file identifiers associated with the second event record; and in response a determination that at least one of the data files identified by the set of input data file identifiers are not included in the valid data file set, determining that a data inconsistency exists with respect to the at least one of the data files identified by the set of input data file identifiers associated with the second event record.

7. The computer-implemented method of claim 4, wherein the operation associated with the second event record is a garbage collection operation configured to remove a data file, identified by the set of input data file identifiers associated with the second event record, from the table, and wherein applying the selected data consistency rule comprises:

determining whether the data file identified by the set of input data file identifiers associated with the second event record is included in the invalid data file set;

in response to a determination that the data file identified by the set of input data file identifiers associated with the second event record is included in the invalid data file set, determining that no data inconsistency exists with respect to the data file identified by the set of input data file identifiers associated with the second event record; and in response to a determination that the data file identified by the set of input data file identifiers associated with the second event record is not included in the invalid data file set, determining that a data inconsistency exists with respect to the data file identified by the set of input data file identifiers associated with the second event record.

8. The computer-implemented method of claim 4, wherein the operation associated with the second event record is a load operation configured to load a data file, identified by the set of output data file identifiers associated with the second event record, from the table, and wherein applying the selected data consistency rule comprises:

determining whether the data file identified by the set of output data file identifiers associated with the second event record is not included in the valid data file and not included in the invalid data file set;

in response to a determination that the data file identified by the set of output data file identifiers associated with the second event record is not included in the valid data file set and not included in the invalid data file set, determining that no data inconsistency exists with respect to the data file identified by the set of output data file identifiers associated with the second event record; and in response to a determination that the data file identified by the set of output data file identifiers associated with the second event record is included in at least one of the valid data file set or the invalid data file set, determining that a data inconsistency exists with respect to the data file identified by the set of output data file identifiers associated with the second event record.

9. A system configured to perform consistency checking of data files that represent a table, comprising:

at least one processor circuit; and at least one memory that stores program code configured to be executed by the at least one processor circuit, the program code comprising:

an event record obtainer configured to receive an ordered sequence of event records associated with the table, each event record in the ordered sequence including information about a particular operation performed with respect to one or more of the data files, the information for the particular operation including a transaction version, an operation type identifying a type of operation represented by the event record, a set of input data file identifiers identifying data files acted on by the particular operation, a set of output data file identifiers identifying data files generated by the particular operation, and an operation status indicating whether the particular operation was committed;

a data file set determiner configured to process each first event record in a plurality of first event records in the ordered sequence, in an order specified by the ordered sequence, by:

maintaining, in a valid data file set, data file identifiers corresponding to data files that should be visible until the currently processed first event;

maintaining, in an invalid data file set, data file identifiers corresponding to data files that should not be visible;

determining whether the operation associated with the first event record was successfully committed based on the operation status associated with the first event record;

in response to determining that the operation associated with the first event record was successfully committed, adding any data file identifier in the set of output data file identifiers associated with the first event records to the valid data file set; and in response to determining that the operation associated with the first event record was not successfully committed, adding any data file identifier in the set of output data file identifiers associated with the first event record to the invalid data file set; and a consistency checker configured to perform the following for a second event record in the ordered sequence that follows at least one of the first event records in the ordered sequence:

determine that a data inconsistency exists with respect to the table based on at least one of the valid data file set or the invalid data file set, and at least one of the set of input data file identifiers associated with the second event record or the set of output data file identifiers associated with the second event record.

10. The system of claim 9, wherein, in response to determining that the operation associated with the first event record was successfully committed, the data file set determiner is further configured to:

move any data file identifier in the set of input data file identifiers of the first event record from the valid data file set to the invalid data file set.

11. The system of claim 9, wherein the event record obtainer is further configured to:

obtain the event records as an unordered sequence; and organize the event records in the ordered sequence based on the transaction versions associated therewith.

12. The system of claim 9, wherein the consistency checker is further configured to:

based on the operation type of the operation associated with the second event record, select a data consistency rule from a plurality of data consistency rules;

apply the selected data consistency rule with respect to one or more of the valid data file set, the invalid data file set, and one or more of the set of input data file identifiers associated with the second event record and the set of output data file identifiers associated with the second event record;

based on the application of the selected data consistency rule, determine whether a data inconsistency exists with respect to one or more data files identified by one or more of the set of input data file identifiers associated with the second event record or the set of output data file identifiers associated with the second event record; and in response to determining that a data inconsistency exists, perform an automatic remediation with respect to the one or more data files identified by one or more of the set of input data file identifiers associated with the second event record or the set of output data file identifiers associated with the second event record.

13. The system of claim 12, wherein the consistency checker is configured perform the automatic remediation by performing one of:

cause the one or more data files, identified by one or more of the set of input data file identifiers associated with the second event record or the set of output data file identifiers associated with the second event record, to be recovered from a backup of the table; or cause the one or more data files, identified by one or more of the set of input data file identifiers associated with the second event record or the set of output data file identifiers associated with the second event record at least one of the first data file or the second data file, to be removed from the table.

14. The system of claim 12, wherein the operation associated with the second event record is one of a merge operation configured to merge data files identified by the set of input data file identifiers associated with the second event record or a re-cluster operation configured to re-arrange data files identified by the set of input data file identifiers associated with the second event record, and
   wherein the consistency checker, in accordance with the selected data consistency rule, performs the following:
      determine whether the data files identified by the set of input data file identifiers associated with the second event record are included the valid data file set;
      in response to a determination that the data files identified by the set of input data file identifiers are included in the valid data file set, determine that no data inconsistency exists with respect to the data files identified by the set of input data file identifiers associated with the second event record; and
      in response a determination that at least one of the data files identified by the set of input data file identifiers are not included in the valid data file set, determine that a data inconsistency exists with respect to the at least one of the data files identified by the set of input data file identifiers associated with the second event record.

15. The system of claim 12, wherein the operation associated with the second event record is a garbage collection operation configured to remove a data file, identified by the set of input data file identifiers associated with the second event record, from the table, and
   wherein the consistency checker, in accordance with the selected data consistency rule, performs the following:
      determine whether the data file identified by the set of input data file identifiers associated with the second event record is included in the invalid data file set;
      in response to a determination that the data file identified by the set of input data file identifiers associated with the second event record is included in the invalid data file set, determine that no data inconsistency exists with respect to the data file identified by the set of input data file identifiers associated with the second event record; and
      in response to a determination that the data file identified by the set of input data file identifiers associated with the second event record is not included in the invalid data file set, determine that a data inconsistency exists with respect to the data file identified by the set of input data file identifiers associated with the second event record.

16. The system of claim 12, wherein the operation associated with the second event record is a load operation configured to load a data file, identified by the set of output data file identifiers associated with the second event record, from the table, and
   wherein the consistency checker, in accordance with the selected data consistency rule, performs the following:
      determine whether the data file identified by the set of output data file identifiers associated with the second event record is not included in the valid data file and not included in the invalid data file set;
      in response to a determination that the data file identified by the set of output data file identifiers associated with the second event record is not included in the valid data file set and not included in the invalid data file set, determine that no data inconsistency exists with respect to the data file identified by the set of output data file identifiers associated with the second event record; and
      in response to a determination that the data file identified by the set of output data file identifiers associated with the second event record is included in at least one of the valid data file set or the invalid data file set, determine that a data inconsistency exists with respect to the data file identified by the set of output data file identifiers associated with the second event record.

17. A computer-readable storage medium having program instructions recorded thereon that, when executed by at least one processor of a computing device, perform a method for consistency checking of data files that represent a table, the method comprising:
   receiving an ordered sequence of event records associated with the table, each event record in the ordered sequence including information about a particular operation performed with respect to one or more of the data files, the information for the particular operation including a transaction version, an operation type identifying a type of operation represented by the event record, a set of input data file identifiers identifying data files acted on by the particular operation, a set of output data file identifiers identifying data files generated by the particular operation, and an operation status indicating whether the particular operation was committed;
   processing each first event record in a plurality of first event records in the ordered sequence, in an order specified by the ordered sequence, by:
      maintaining, in a valid data file set, data file identifiers corresponding to data files that should be visible until the currently processed first event;
      maintaining, in an invalid data file set, data file identifiers corresponding to data files that should not be visible;
      determining whether the operation associated with the first event record was successfully committed based on the operation status associated with the first event record;
      in response to determining that the operation associated with the first event record was successfully committed, adding any data file identifier in the set of output data file identifiers associated with the first event record to the valid data file set; and
      in response to determining that the operation associated with the first event record was not successfully committed, adding any data file identifier in the set of output data file identifiers associated with the first event record to the invalid data file set; and
   performing the following for a second event record in the ordered sequence that follows at least one of the first event records in the ordered sequence:
      determining that a data inconsistency exists with respect to the table based on at least one of the valid data file set or the invalid data file set, and at least one of the set of input data file identifiers associated with the second event record or the set of output data file identifiers associated with the second event record.

18. The computer-readable storage medium of claim 17, the method further comprising, in response to determining that the operation associated with the first event record was successfully committed, moving any data file identifier in the set of input data file identifiers of the first event record from the valid data file set to the invalid data file set.

19. The computer-readable storage medium of claim 17, wherein obtaining the ordered sequence of event records comprises:
   obtaining the event records as an unordered sequence; and
   organizing the event records in the ordered sequence based on the transaction versions associated therewith.

20. The computer-readable storage medium of claim 17, wherein determining that a data inconsistency exists comprises:
   based on the operation type of the operation associated with the second event record, selecting a data consistency rule from a plurality of data consistency rules;
   applying the selected data consistency rule with respect to one or more of the valid data file set, the invalid data file set, and one or more of the set of input data file identifiers associated with the second event record and the set of output data file identifiers associated with the second event record;
   based on the application of the selected data consistency rule, determining whether a data inconsistency exists with respect to one or more data files identified by one or more of the set of input data file identifiers associated with the second event record or the set of output data file identifiers associated with the second event record; and
   in response to determining that a data inconsistency exists, performing an automatic remediation with respect to the one or more data files identified by one or more of the set of input data file identifiers associated with the second event record or the set of output data file identifiers associated with the second event record.

* * * * *